United States Patent
Bang et al.

(10) Patent No.: US 8,121,173 B2
(45) Date of Patent: *Feb. 21, 2012

(54) APPARATUS AND METHOD FOR MODULATING DATA MESSAGE BY EMPLOYING ORTHOGONAL VARIABLE SPREADING FACTOR (OVSF) CODES IN MOBILE COMMUNICATING SYSTEM

(75) Inventors: Seung-Chang Bang, Taejon (KR); Tae-Joong Kim, Taejon (KR); Jae-Heung Kim, Taejon (KR); Jung-Im Kim, Taejon (KR); Jong-Suk Chae, Taejon (KR); Hyuck-Jae Lee, Taejon (KR); Jae-Ryong Shim, Taejon (KR); Narm-Hee Lee, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 275 days.

This patent is subject to a terminal disclaimer.

(21) Appl. No.: 12/259,072

(22) Filed: Oct. 27, 2008

(65) Prior Publication Data

US 2009/0097580 A1   Apr. 16, 2009

Related U.S. Application Data

(63) Continuation of application No. 11/618,361, filed on Dec. 29, 2006, now Pat. No. 7,586,973, which is a continuation of application No. 09/584,189, filed on May 31, 2000, now Pat. No. 7,443,906.

(30) Foreign Application Priority Data

May 31, 1999   (KR) .................................. 1999-19813
Aug. 30, 1999   (KR) .................................. 1999-36383

(51) Int. Cl.
*H04B 1/707* (2011.01)

(52) U.S. Cl. ........................................................ 375/140
(58) Field of Classification Search .................. 375/130, 375/140–142, 144, 145, 147, 146, 295
See application file for complete search history.

(56) References Cited

U.S. PATENT DOCUMENTS 5,103,459 A   4/1992   Gilhousen et al.
(Continued)

FOREIGN PATENT DOCUMENTS

CN   1133658   10/1994
(Continued)

OTHER PUBLICATIONS

Edited by Matsushita; UTRA Physical Layer Description, TDD parts for public operation; Layer 1 Expert Group meeting, Bocholt May 18-20; Nov. 13, 1998; pp. 1-27.
(Continued)

*Primary Examiner* — Kevin M Burd
(74) *Attorney, Agent, or Firm* — Hunton & Williams LLP

(57) ABSTRACT

A method for converting source data to a channel-modulated signal having a plurality of pairs of in-phase (I) and quadrature-phase (Q) data in a mobile station, wherein the mobile station uses at least one channel, includes the steps of: a) encoding the source data to generate at least one data part and a control part; b) generating at least one spreading code to be allocated to the channel, wherein each spreading code is selected on the basis of a data rate of the data part and the control part and spreading codes are selected so that two consecutive pairs of the I and Q data are correspondent to two points located on same point or symmetrical with respect to a zero point on a phase domain; and c) spreading the control part and the data part by using the spreading code, to thereby generate the channel-modulated signal. The method is capable of improving a power efficiency of a mobile station by reducing a peak-to-average power ratio in a mobile communication system.

30 Claims, 22 Drawing Sheets

U.S. PATENT DOCUMENTS

| | | | |
|---|---|---|---|
| 5,235,614 | A | 8/1993 | Bruckert et al. |
| 5,416,797 | A | 5/1995 | Gilhousen et al. |
| 5,418,813 | A | 5/1995 | Schaffner et al. |
| 5,546,424 | A | 8/1996 | Miyake |
| 5,566,164 | A | 10/1996 | Ohison |
| 5,602,833 | A | 2/1997 | Zehavi |
| 5,619,524 | A | 4/1997 | Ling et al. |
| 5,619,526 | A | 4/1997 | Kim et al. |
| 5,638,362 | A | 6/1997 | Dohl et al. |
| 5,712,869 | A | 1/1998 | Lee et al. |
| 5,734,647 | A * | 3/1998 | Yoshida et al. ............... 370/335 |
| 5,818,867 | A | 10/1998 | Rasmussen et al. |
| 5,870,378 | A | 2/1999 | Huang et al. |
| 5,930,230 | A | 7/1999 | Odenwalder et al. |
| 5,940,434 | A | 8/1999 | Lee et al. |
| 5,960,029 | A | 9/1999 | Kim et al. |
| 5,966,373 | A | 10/1999 | Stephenson et al. |
| 5,991,284 | A | 11/1999 | Willenegger et al. |
| 6,009,091 | A | 12/1999 | Stewart et al. |
| 6,028,888 | A | 2/2000 | Roux |
| 6,047,306 | A | 4/2000 | Hikila et al. |
| 6,097,712 | A | 8/2000 | Secord et al. |
| 6,108,369 | A * | 8/2000 | Ovesjo et al. ............... 375/146 |
| 6,122,310 | A | 9/2000 | Ziemer et al. |
| 6,246,697 | B1 | 6/2001 | Whinnett et al. |
| 6,246,976 | B1 | 6/2001 | Mukaigawa et al. |
| 6,381,229 | B1 | 4/2002 | Narvinger et al. |
| 6,519,278 | B1 | 2/2003 | Hiramatsu |
| 6,560,194 | B1 | 5/2003 | Gourgue et al. |
| 7,443,906 | B1 * | 10/2008 | Bang et al. ............... 375/140 |
| 7,586,973 | B2 * | 9/2009 | Bang et al. ............... 375/140 |
| 2003/0147655 | A1 | 8/2003 | Shattil |

FOREIGN PATENT DOCUMENTS

| | | |
|---|---|---|
| DE | 19708626 A1 | 9/1998 |
| EP | 0783210 | 7/1997 |
| EP | 0 918 410 | 9/1997 |
| EP | 0814581 A2 | 12/1997 |
| EP | 0 921 652 | 10/1998 |
| JP | 07038962 | 2/1995 |
| KR | 1997-0031399 | 6/1997 |
| KR | 0155510 | 7/1998 |
| KR | 10 0298340 | 5/2001 |
| WO | WO 92/17011 | 10/1992 |
| WO | WO 95/03652 | 2/1995 |
| WO | WO 95/12937 | 5/1995 |
| WO | WO 97-33400 | 9/1997 |
| WO | WO 97/45970 | 12/1997 |
| WO | WO 97/47098 | 12/1997 |
| WO | WO 99/38337 | 7/1999 |
| WO | WO 99/59265 | 11/1999 |
| WO | WO 00/42752 | 1/2000 |

OTHER PUBLICATIONS

Shim, et al.; Spectrally Efficient Modulation and Spreading Scheme for CDMA Systems; Nov. 12, 1998 Electronics Letters; vol. 34, pp. 2210-2211.

Ericsson, "Uplink channelization code allocation in UTRA/FDD, Decision", TSG-RAN Working Group 1 meeting #6, TSGR1#6(99)845, Espoo, Finland, Jul. 13-16, 1999, pp. 1-6.

ETRI, "Channelization code allocation in uplink multi-code transmissions, Decision", TSG-RAN Working Group 1 meeting #6, TSGR1#6(99)828, Espoo, Finland, Jul. 13-16, 1999, pp. 1-6.

3$^{rd}$ Generation Partnership Project (3GPP), Technical Specification Group (TSG), Radio Access Network (RAN); Working Group 1 (WG1); Spreading and Modulation (FDD), TS 25.213,V2.0.0 (Apr. 1999), pp. 1-26.

3$^{rd}$ Generation Partnership Project (3GPP), Technical Specification Group (TSG), Radio Access Network (RAN); Working Group 1 (WG1); Spreading and Modulation (FDD), TS 25.213,V2.1.0 (Jun. 1999), pp. 1-26.

CESM/Pro Telecom, et al., "FMA-FRAMES Multiple AccessA Harmonized Concept for UMTS/IMT-2000; FMA2-Wideband CDEMDA", Homepage: http://WWW.de.infowin.org/ACTS/RUS/Projects/Frames, pp. 1-14.

Birgenheier, Raymond a.; "Overview of Code-Domain Power, Timing, and Phase Measurements"; Hewlett;Packard Journal: vol. 47, No. 1, pp. 73-93; (Feb. 1996).

INSPEC Abstract Accession No. 6468729 and "3$^{rd}$ CDMA International Conference and Exhibition," pbulished 1998, ETRI, pp. 101-105, vol. 2, Bang et al. "A Spectrally Efficient Modulation and Spreading Scheme Using Orthogonal Channelization and Rotator".

Laird, et al. "A Peak-to-Average Power Reduction Method for Third Generation CDMA Reverse Links," IEEE Vehicular Technology Conference, vol. 1, pp. 551-555, May 16, 1999.

Lee, et al. "Direct Sequence Spread Spectrum Walsh-QPSK Modulation," IEEE Transactions on Communications, Vo. 46, No. 9, Sep. 1998.

UMTS Layer 1 Expert Group Meeting, tdoc120, Bocholt, May 18-20, 1998, pp. 2-27, et al. "Direct Sequence Spread Spectrum Walsh-QPSK Modulation," IEEE Transactions on Communications, vol. 46, No. 9, Sep. 1998.

Request for Reexamination of U.S. Patent No. 5,960,029 Filed Mar. 16, 2009.

Request for Reexamination of U.S. Patent No. RE40,385, Filed Mar. 16, 2009.

United States Patent & Trademark Office Communication, "Decision Sua Sponte Vacating Inter Partes Reexamination Filing Date", Control No. 95/000,454 mailed May 27, 2009.

Publication No. 1019950054532 Filed Jul. 31, 1997.

"Physical Layer Standard for cdma2000 Spread Spectrum Systems", Release A, 3GPP2 C.S0002-A, Jun. 9, 2000.

TIA/EIA PN-3241 Ballot Version, "Mobile Station—Base Station Compatibility Standard for Dual-Mode Wideband Spread Spectrum Cellular System", Dec. 1994.

"Peak to Peak Average Power Reduction Method for 3G Reverse Link", submitted to the Telecommunications Industry Association TR45.5 Standards Committee Jan. 26, 1998.

Figure 1 of US RE40385, Published Jun. 17, 2008.

Ovesjo et al., "Frames Multiple Access Mode 2—Wideband CDMA," IEEE (1997).

"FDD Mode Uplink OVSF Choice," TSG-RAN Working Group 1 Meeting #5, Source: Motorola (1999).

TSG-RAN Working Group 1 Meeting #5, Agenda Item: 10 and 11, Ad hoc # 10 (1999).

WCDMA/NA, T1P1—Wireless/Mobile Services and Systems Technical Sub-Committee, IMT-2000 Radio Transmission Technology Candidate (1998).

Technical Specification: 3$^{rd}$ Generation Partnership Project; Tech. Spec. Group Radio Access Network; Physical Channels and Mapping of Transport Channels onto Physical Channels (FDD) (3G TS 25.211 version 3.0.0) (1999).

Technical Specification: 3$^{rd}$ Generation Partnership Project (3GPP); Tech. Spec. Group (TSG) Radio Access Network (RAN); Working Group 1 (WG1); Multiplexing and Channel Coding (FDD) (TS 25.212) (1999).

Technical Specification: 3$^{rd}$ Generation Partnership Project; Tech. Spec. Group Radio Access Network, Multiplexing and Channel Coding (FDD) (3G TS 25.212 version 3.0.0) (1999).

Technical Specification: 3$^{rd}$ Generation Partnership Project (3GPP); Tech. Spec. Group (TSG) Radio Access Network Spreading and Modulation (FDD) (3G TS 25.213 version 3.0.0) (1999).

Technical Specification: 3$^{rd}$ Generation Partnership Project (3GPP); Tech. Spec. Group (TSG) Radio Access Network (RAN); Working Group 1 (WG1); Physical Channels and mapping of Transport Channels onto Physical Channels (FDD) (1999).

3GPP (S1.13) 3Gpp FDD, spreading and Modulation Specification (1999).

Freiberg et al., "Crest Factor Reduction Using Orthogonal Spreading Codes in Multi-Carrier CDMA Systems," IEEE (1997).

4$^{th}$ ARIB-TTA Meeting on IMT-2000 Standardization (1998).

Amplitude Differences Between Uplink DPCCH and DPDCHs, TSG-RAN Working Group 1 Meeting # 4, Source: Ericsson (1999).

Lang et al., "Comparison of Correlation Parameters of Binary Codes for DS/CDMA Systems," IEEE (1994).

Garg et al., "Third Generation (3G) Communications Systems," IEEE (1999).

Dasilva et al., "Multicarrier Orthogonal CDMA Signals for Quasi-Synchronous Communication Systems," III Journal on Selected Areas in Communications, vol. 12, No. 5, Jun. 1994.

Popovic, Efficient Despreaders for Multi-Code CDMA Systems, IEEE (1997).

Yip et al., "Performance Sensitivity of Quasi-Synchronous, Multicarrier DS-CDMA Systems due to Carrier Frequency Disturbance," IEEE, International Conference on Communication Tech. (1998).

Bang et al., "Performance Analysis of a Wideband CDMA System for FPLMTS," IEEE (1997).

Zhang et al., "A Sequency Multiplexing Technique for Mobile Communication Systems" (1993).

IMT-2000 Cooperative Activities between ARIB and TTA [Draft] (2000).

Ochiai et al., "OFDM-CDMA with Peak Power Reduction Based on the Spreading Sequences", Institute of Industrial Science, University of Tokyo, IEEE (1998).

* cited by examiner

APPARATUS AND METHOD FOR MODULATING DATA MESSAGE BY EMPLOYING ORTHOGONAL VARIABLE SPREADING FACTOR (OVSF) CODES IN MOBILE COMMUNICATING SYSTEM

RELATED APPLICATIONS

This patent application is a Continuation of U.S. patent application Ser. No. 11/618,361, which is a Continuation of U.S. patent application Ser. No. 09/584,189, filed on May 31, 2000, which claims priority to and the benefit of Korean Patent Application No. 1999-19813, filed on May 31, 1999 and Korean Patent Application No. 1999-36383, filed on Aug. 30, 1999, all of which are hereby incorporated by reference in their entirety.

FIELD OF THE INVENTION

The present invention relates to an apparatus and method for modulating a data message in a mobile communication system; and, more particularly, to an apparatus and method for modulating a data message by employing orthogonal variable spreading factor (OVSF) codes in a mobile communication system.

DESCRIPTION OF THE PRIOR ART

Generally, a mobile communication system such as an international mobile telecommunication-2000 (IMT-2000) system is capable of providing various services of good quality and large capacity, an international roaming and so on. The mobile communication system can be applicable to high-speed data and multimedia services such as an Internet service and an electronic commerce service. The mobile communication system carries out orthogonal spread with respect to multiple channels. The mobile communication system allocates the orthogonal spread channels to an in-phase (I) branch and a quadrature-phase (Q) branch. A peak-to-average power ratio (PAPR) needed to simultaneously transmit I-branch data and Q-branch data affects power efficiency of a mobile station and a battery usage time of the mobile station.

The power efficiency and the battery usage time of the mobile station are closely related to a modulation scheme of the mobile station. As a modulation standard of IS-2000 and asynchronous wideband-CDMA, the modulation scheme of orthogonal complex quadrature phase shift keying (OC-QPSK) has been adopted. The modulation scheme of OCQPSK is disclosed in an article by JaeRyong Shim and SeungChan Bang: '*Spectrally Efficient Modulation and Spreading Scheme for CDMA Systems*' in electronics letters, Nov. 12, 1998, vol. 34, No. 23, pp. 2210-2211.

As disclosed in the article, the mobile station carries out the orthogonal spread by employing a Hadamard sequence as a Walsh code in the modulation scheme of the OCQPSK. After the orthogonal spread, I and Q channels are spread by a Walsh rotator and a spreading code, e.g., a pseudo noise (PN) code, a Kasami code, a Gold code and so on.

Further, as for multiple channels, the mobile station carries out the orthogonal spread by employing different Hadamard sequences. After the orthogonal spread, the orthogonal spread channels are coupled to I and Q branches. Then, the orthogonal spread channels coupled to the I branch and the orthogonal spread channels coupled to the Q branch is separately summed. The I and Q branches are scrambled by the Walsh rotator and the scrambling code. However, there is a problem that the above-mentioned modulation scheme can not effectively reduce the PAPR in the mobile communication system.

SUMMARY OF THE INVENTION

It is, therefore, an object of the present invention to provide an apparatus and method for modulating a data message that is capable of improving a power efficiency of a mobile station by reducing a peak-to-average power ratio in a mobile communication system.

In accordance with an embodiment of an aspect of the present invention, there is provided an apparatus for converting source data to a channel-modulated signal having a plurality of pairs of in-phase (I) and quadrature-phase (Q) data in a mobile station, wherein the mobile station uses at least one channel, comprising: channel coding means for encoding the source data to generate at least one data part and a control part; code generating means for generating at least one spreading code to be allocated to the channel, wherein each spreading code is selected on the basis of a data rate of the data part and the control part and spreading codes are selected so that two consecutive pairs of the I and Q data are correspondent to two points located on same point or symmetrical with respect to a zero point on a phase domain; and spreading means for spreading the control part and the data part by using the spreading code, to thereby generate the channel-modulated signal.

In accordance with another embodiment of the aspect of the present invention, there is provided an apparatus for converting source data to a channel-modulated signal having a plurality of pairs of in-phase (I) and quadrature-phase (Q) data in a mobile station, wherein the mobile station uses N number of channels where N is a positive integer, comprising: channel coding means for encoding the source data to generate (N−1) number of data parts and a control part; code generating means for generating N number of spreading codes to be allocated to the channels, wherein each spreading code is selected on the basis of a data rate of each data part and the control part and the spreading codes are selected so that two consecutive pairs of the I and Q data are correspondent to two points located on same point or symmetrical with respect to a zero point on a phase domain; and spreading means for spreading the control part and the data parts by using the spreading codes, to thereby generate the channel-modulated signal.

In accordance with an embodiment of another aspect of the present invention, there is provided a mobile station for converting source data to a channel-modulated signal having a plurality of pairs of in-phase (I) and quadrature-phase (Q) data, wherein the mobile station uses N number of channels where N is a positive integer, comprising: channel coding means for encoding the source data to generate (N−1) number of data parts and a control part; code generating means for generating N number of spreading codes to be allocated to the first and the second channels, wherein each spreading code is selected on the basis of a data rate of each data part and the control part and the spreading codes are selected so that two consecutive pairs of the I and Q data are correspondent to two points located on same point or symmetrical with respect to a zero point on a phase domain; and spreading means for spreading the control part and the data parts by using the spreading codes, to thereby generate the channel-modulated signal.

In accordance with an embodiment of further another aspect of the present invention, there is provided a method for converting source data to a channel-modulated signal having a plurality of pairs of in-phase (I) and quadrature-phase (Q)

data in a mobile station, wherein the mobile station uses at least one channel, comprising the steps of: a) encoding the source data to generate at least one data part and a control part; b) generating at least one spreading code to be allocated to the channel, wherein each spreading code is selected on the basis of a data rate of the data part and the control part and spreading codes are selected so that two consecutive pairs of the I and Q data are correspondent to two points located on same point or symmetrical with respect to a zero point on a phase domain; and c) spreading the control part and the data part by using the spreading code, to thereby generate the channel-modulated signal.

In accordance with another embodiment of further another aspect of the present invention, there is provided a method for converting source data to a channel-modulated signal having a plurality of pairs of in-phase (I) and quadrature-phase (Q) data in a mobile station, wherein the mobile station uses N number of channels where N is a positive integer, comprising: a) encoding the source data to generate (N−1) number of data parts and a control part; b) generating N number of spreading codes to be allocated to the channels, wherein each spreading code is selected on the basis of a data rate of each data part and the control part and the spreading codes are selected so that two consecutive pairs of the I and Q data are correspondent to two points located on same point or symmetrical with respect to a zero point on a phase domain; and c) spreading the control part and the data parts by using the spreading codes, to thereby generate the channel-modulated signal.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

Figure 1:
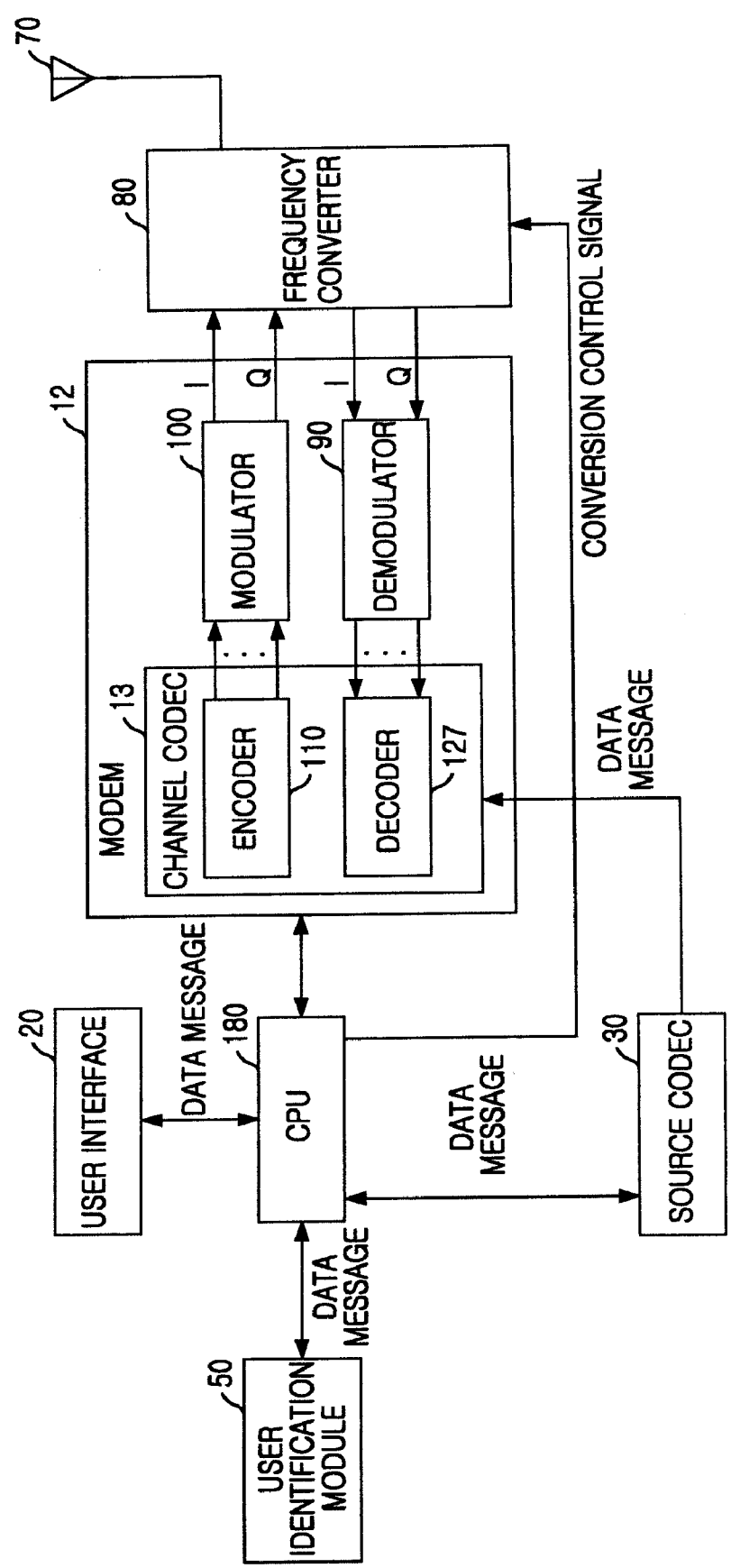
FIG. 1 is a block diagram illustrating a mobile station to which the present invention is applied.

Referring to FIG. 1, there is shown a block diagram illustrating a mobile station to which the present invention is applied. As shown, the mobile station includes a user interface 20, a central processing unit (CPU) 180, a modem 12, a source codec 30, a frequency converter 80, a user identification module 50 and an antenna 70. The modem 12 includes a channel codec 13, a modulator 100 and a demodulator 120. The channel codec 13 includes an encoder 110 and a decoder 127.

The user interface 20 includes a display, a keypad and so on. The user interface 20, coupled to the CPU 180, generates a data message in response to a user input from a user. The user interface 20 sends the data message to the CPU 180.

The user identification module 50, coupled to the CPU 180, sends user identification information as a data message to the CPU 180. The source codec 30, coupled to the CPU 180 and the modem 12, encodes source data, e.g., video, voice and so on, to generate the encoded source data as a data message. Then, the source codec 30 sends the encoded source data as the data message to the CPU 180 or the modem 12. Further, the source codec 30 decodes the data message from the CPU 180 or the modem 12 to generate the source data, e.g., video, voice and so on. Then, the source codec 30 sends the source data to the CPU 180.

The encoder 110, contained in the channel codec 13, encodes the data message from the CPU 180 or the source codec 30 to generate one or more data parts. Then, the encoder 110 generates a control part. The encoder 110 sends the one or more data parts to the modulator 100. The modulator 100 modulates the one or more data parts and the control part to generate I and Q signals as baseband signals. The frequency converter 80 converts the baseband signals to intermediate frequency (IF) signals in response to a conversion control signal from the CPU 180. After converting the baseband signals to the IF signals, the frequency converter 80 converts the IF signals to radio frequency (RF) signals. The frequency converter 80 sends the RF signals to the antenna 70. Further, the frequency converter 80 controls a gain of the RF signals. The antenna 70 sends the RF signals to a base station (not shown).

The antenna 70 sends the RF signals from the base station to the frequency converter 80. The frequency converter 80 converts the RF signals to the IF signals. After converting the RF signals to the IF signals, the frequency converter 80 converts the IF signals to the baseband signals as the I and Q signals. The demodulator 90 demodulates the I and Q signals to generate the one or more data parts and the control part. The decoder 127, contained in the channel codec 13, decodes the one or more data parts and the control part to generate the data message. The decoder 127 sends the data message to the CPU 180 or the source codec 30.

Figure 2:
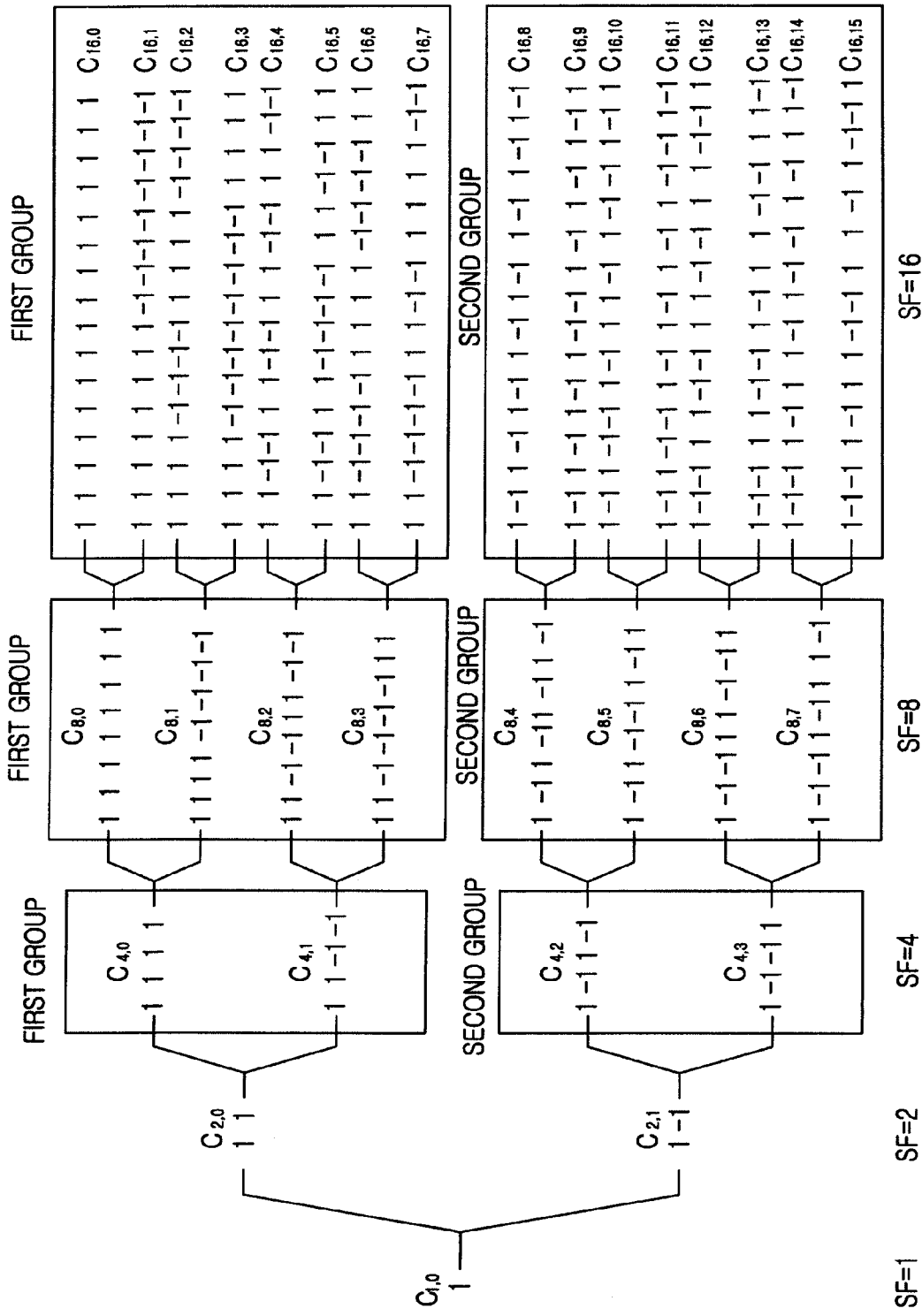
FIG. 2 is an exemplary view illustrating a tree structure of spreading codes applied to the present invention.

Referring to FIG. 2, there is shown an exemplary view illustrating a tree structure of spreading codes as orthogonal variable spreading factor (OVSF) codes applied to the present invention. As shown, a spreading code is determined by a spreading factor (SF) and a code number in a code tree, wherein the spreading code is represented by $C_{SF,\ code\ number}$. $C_{SF,\ code\ number}$ is made up of a real-valued sequence. The SF is $2^N$ where N is 0 to 8, and the code number is 0 to $2^N-1$.

$$\begin{bmatrix} C_{2,0} \\ C_{2,1} \end{bmatrix} = \begin{bmatrix} C_{1,0} & C_{1,0} \\ C_{1,0} & -C_{1,0} \end{bmatrix} = \begin{bmatrix} 1 & 1 \\ 1 & -1 \end{bmatrix} \text{ where } C_{1,0} = 1 \quad \text{Eq. (1)}$$

$$\begin{bmatrix} C_{2^{(N+1)},0} \\ C_{2^{(N+1)},1} \\ C_{2^{(N+1)},2} \\ C_{2^{(N+1)},3} \\ \vdots \\ \vdots \\ \vdots \\ C_{2^{(N+1)},2^{(N+1)}-2} \\ C_{2^{(N+1)},2^{(N+1)}-1} \end{bmatrix} = \begin{bmatrix} C_{2^N,0} & C_{2^N,0} \\ C_{2^N,0} & -C_{2^N,0} \\ C_{2^N,1} & C_{2^N,1} \\ C_{2^N,1} & -C_{2^N,1} \\ \vdots & \vdots \\ \vdots & \vdots \\ \vdots & \vdots \\ C_{2^N,2^N-1} & C_{2^N,2^N-1} \\ C_{2^N,2^N-1} & -C_{2^N,2^N-1} \end{bmatrix} \text{ where } N \text{ is 1 to 7} \quad \text{Eq. (2)}$$

For example, a spreading code having an SF of 8 and a code number of 1 is represented by $C_{8,1} = \{1, 1, 1, 1, -1, -1, -1, -1\}$ according to Eqs. (1) and (2). In case where the SF is more than 2, the spreading codes are grouped by two groups, including a first group and a second group according to a code number sequence. The first group includes the spreading codes with the SF and code numbers of 0 to SF/2−1 and the second group includes the spreading codes with the SF and code numbers of SF/2 to SF−1. Therefore, the number of spreading codes contained in the first group is the same as that of spreading codes contained in the second group.

Each spreading code contained in the first or second group is made up of real values. Each spreading code contained in the first or second group can be employed in an OCQPSK modulation scheme. It is preferred that a spreading code, contained in the first group, is selected for the OCQPSK modulation scheme. However, where a spreading code, contained in the second group, is multiplied by another spreading code with a minimum code number, i.e., SF/2, contained in the second group, the multiplication of the spreading codes, contained in the second group, becomes the same as a spreading code contained in the first group. Accordingly, the multiplication of the spreading codes contained in the second group is represented by a spreading code of the first group. As a result, all the spreading codes, i.e., OVSF codes, of the first and second groups are useful for reducing the peak-to-average power ratio (PAPR) of the mobile station.

Figure 3:
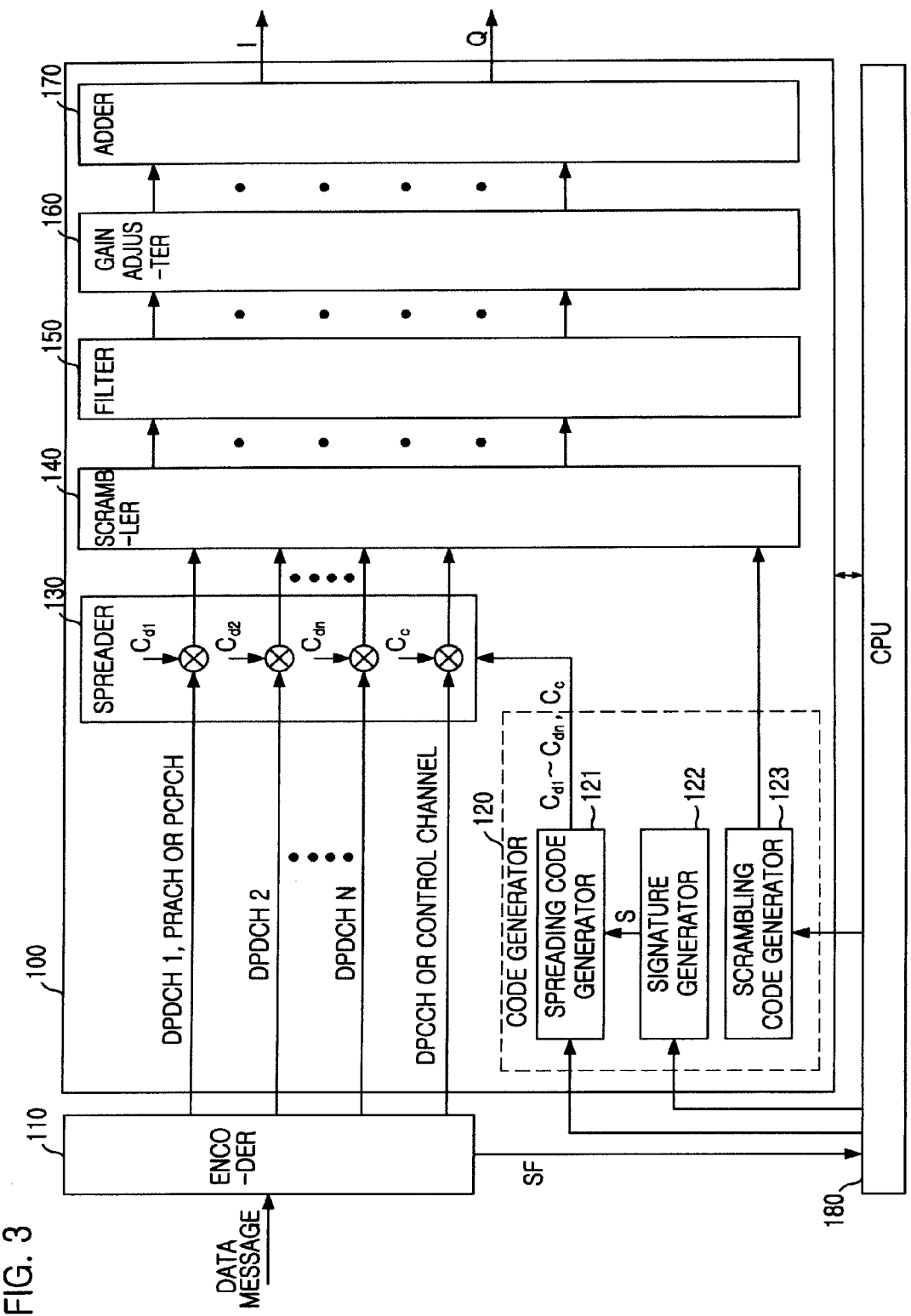
FIG. 3 is an exemplary block diagram depicting a modulator shown in FIG. 1 in accordance with the present invention.

Referring to FIG. 3, there is shown a block diagram depicting a modulator shown in FIG. 1 in accordance with the present invention. The mobile communication system includes a base station and a mobile station employing a plurality of channels, wherein the mobile station includes the modulator. The channels include a control channel and one or more data channels.

The one or more data channels include a physical random access channel (PRACH), a physical common packet channel (PCPCH) and dedicated physical channel (DPCH). In a PRACH or PCPCH application, a control channel and only one data channel, i.e., PRACH or PCPCH, are coupled between the encoder 110 and the spreader 130. The DPCH includes dedicated physical data channels (DPDCHs). In a DPCH application, a dedicated physical control channel (DPCCH) as a control channel and up to six data channels, i.e., DPDCH 1 to DPDCH 5 are coupled between the encoder 110 and the spreader 130. As shown, a modulator 100 includes an encoder 110, a code generator 120, a spreader 130, a scrambler 140, a filter 150, a gain adjuster 160 and an adder 170.

The encoder 110 encodes the data message to be transmitted to the base station to generate one or more data parts. The encoder 110 generates a control part having a control information. The encoder 110 evaluates an SF based on a data rate of the one or more data parts.

The CPU 180, coupled to the encoder 110, receives the SF related to the one or more data parts from the encoder 110. The CPU 180 produces one or more code numbers related to the one or more data parts and an SF and a code number related to the control part.

The code generator 120 includes a spreading code generator 121, a signature generator 122 and a scrambling code generator 123. The code generator 120, coupled to the CPU 180, generates spreading codes, i.e., $C_{d1}$ to $C_{dn}$ and $C_c$, a signature S and a complex-valued scrambling code. The spreading code generator 121, coupled to the CPU 180 and the spreader 130, generates the spreading codes in response to the SF and the one or more code numbers related to the one or more data parts and an SF and a code number related to the control part from the CPU 180. The spreading code generator 121 sends the spreading codes to the spreader 130.

The signature generator 122, coupled to the CPU 180 and the spreading code generator 121, generates the signature S to send the signature S to the spreading code generator 121. The scrambling code generator 123 generates the complex-valued scrambling code to send the complex-valued scrambling code to the scrambler 140.

The spreader 130 spreads the control part and the one or more data parts from the encoder 110 by the spreading codes from the code generator 120.

The scrambler 140 scrambles the complex-valued scrambling code, the one or more data parts and the control part spread by the spreader 130, thereby generating scrambled signals. The scrambler 140 includes a Walsh rotator, which is typically employed in the OCQPSK modulation scheme. The Walsh rotator rotates the one or more data parts and the control part spread by the spreader 130.

The filter 150, i.e., a root raised cosine (PRC) filter, pulse-shapes the scrambled signals to generate pulse-shaped signals. The gain adjuster 160 multiplies each of the pulse-shaped signals by the gain of each channel, thereby generating gain-adjusted signals. The adder 170 sums the gain-adjusted signals related to an I branch or the gain-adjusted signals related to a Q branch, to thereby generate a channel-modulated signal having a plurality of pairs of I and Q data in the mobile station.

Figure 4:
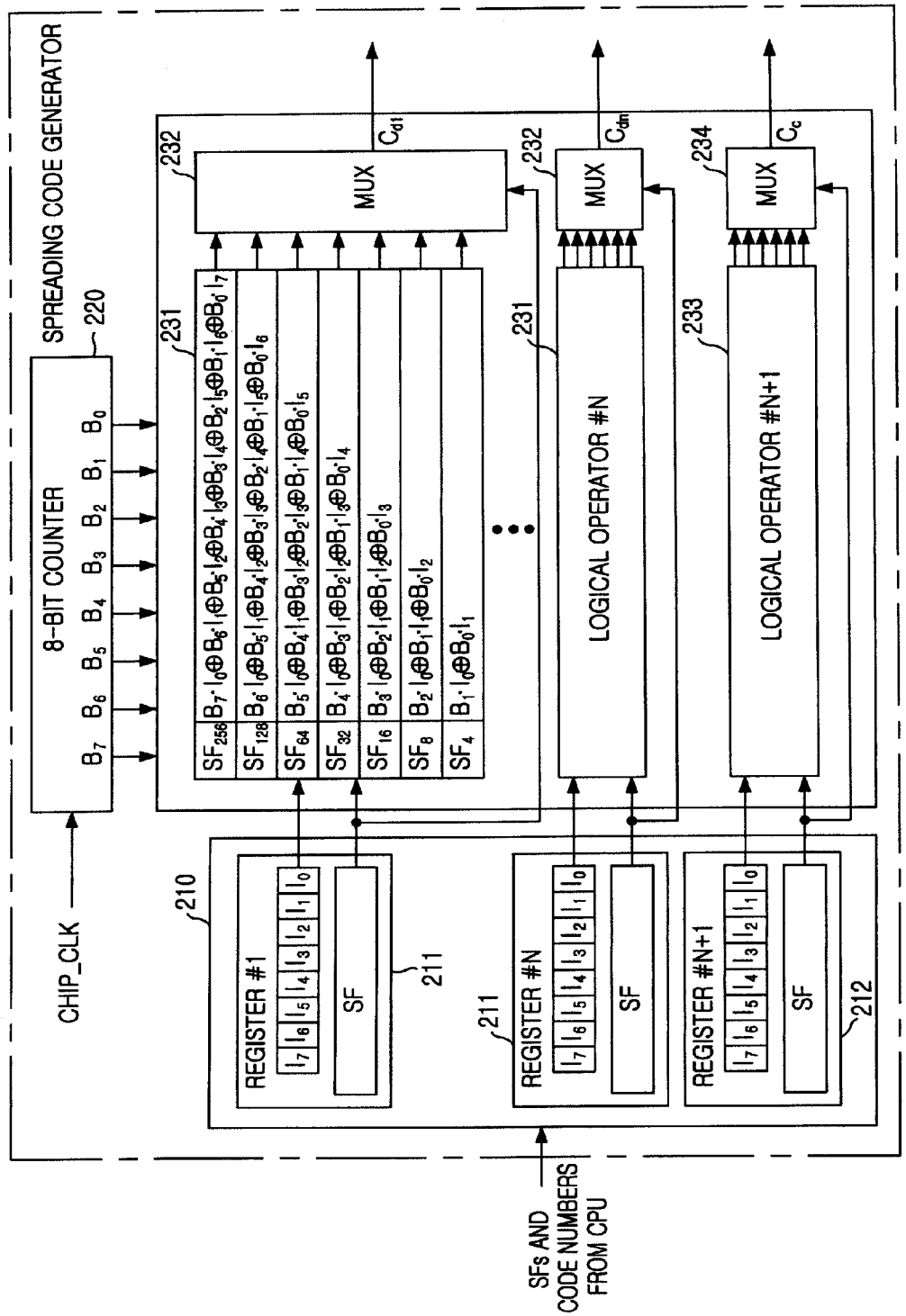
FIG. 4 is a block diagram describing a spreading code generator shown in FIG. 3.

Referring to FIG. 4, there is shown a block diagram describing a spreading code generator shown in FIG. 3. As shown, the spreading code generator includes a storage device 210, an 8-bit counter 220, a plurality of logical operators 231 and 233 and a plurality of multiplexers 232 and 234.

The storage device 210 includes one or more registers 211 related to the one or more data parts and a register 212 related to the control part. The one or more registers 211 stores an SF and code numbers related to the one or more data parts sent from the CPU 180 shown in FIG. 3. The register 212 stores an SF and a code number related to the control part sent from the CPU 180.

The 8-bit counter 220 consecutively produces a count value of $B_7B_6B_5B_4B_3B_2B_1B_0$ as 8-bit count value in synchronization with a clock signal CHIP_CLK issued from an external circuit, wherein $B_0$ to $B_7$ are made up of a binary value of 0 or 1, respectively.

The one or more logical operators 231 carry out one or more logical operations with the SF and the code numbers related to the one or more data parts stored in the one or more register 211, thereby generating the spreading codes related to the one or more data parts. A code number is represented by $I_7I_6I_5I_4I_3I_2I_1I_0$, wherein $I_0$ to $I_7$ are the binary value of 0 or 1, respectively.

The logical operator 233 carries out a logical operation with the SF and the code number of $I_7I_6I_5I_4I_3I_2I_1I_0$ related to the control part stored in the register 212, thereby generating a spreading code related to the control part.

$$\prod_{i=0}^{N-2} \oplus I_i \cdot B_{N-1-i} \text{ where } 2 \leq N \leq 8 \qquad \text{Eq. (3)}$$

where "·" denotes a multiplication in modulo 2 and $\Pi^\oplus$ denotes an exclusive OR operation. Each logical operator 231 or 233 carries out a logical operation according to Eq. (3) where $SF=2^N$.

If the SF is 256, each logical operator 231 or 233 carries out a logical operation of $B_7 \cdot I_0 \oplus B_6 \cdot I_1 \oplus B_5 \cdot I_2 \oplus B_4 \cdot I_3 \oplus B_3 \cdot I_4 \oplus B_2 \cdot I_5 \oplus B_1 \cdot I_6 \oplus B_0 \cdot I_7$.

If the SF is 128, each logical operator 231 or 233 carries out a logical operation of $B_6 \cdot I_0 \oplus B_5 \cdot I_1 \oplus B_4 \cdot I_2 \oplus B_3 \cdot I_3 \oplus B_2 \cdot I_4 \oplus B_1 \cdot I_5 \oplus B_0 \cdot I_6$.

If the SF is 64, each logical operator 231 or 233 carries out a logical operation of $B_5 \cdot I_0 \oplus B_4 \cdot I_1 \oplus B_3 \cdot I_2 \oplus B_2 \cdot I_3 \oplus B_1 \cdot I_4 \oplus B_0 \cdot I_5$.

If the SF is 32, each logical operator 231 or 233 carries out a logical operation of $B_4 \cdot I_0 \oplus B_3 \cdot I_1 \oplus B_2 \cdot I_2 \oplus B_1 \cdot I_3 \oplus B_0 \cdot I_4$.

If the SF is 16, each logical operator 231 or 233 carries out a logical operation of $B_3 \cdot I_0 \oplus B_2 \cdot I_1 \oplus B_1 \cdot I_2 \oplus B_0 \cdot I_3$.

If the SF is 8, each logical operator 231 or 233 carries out a logical operation of $B_2 \cdot I_0 \oplus B_1 \cdot I_1 \oplus B_0 \cdot I_2$.

If the SF is 4, each logical operator 231 or 233 carries out a logical operation of $B_1 \cdot I_0 \oplus B_0 \cdot I_1$.

The one or more multiplexers 232 selectively output the one or more spreading codes from the one or more logical operators 231 in response to one or more select signals as the SF related to the one or more data parts.

The multiplexer 234 selectively outputs the spreading code from the logical operator 233 in response to a select signal as the SF related to the control part.

Figure 5:
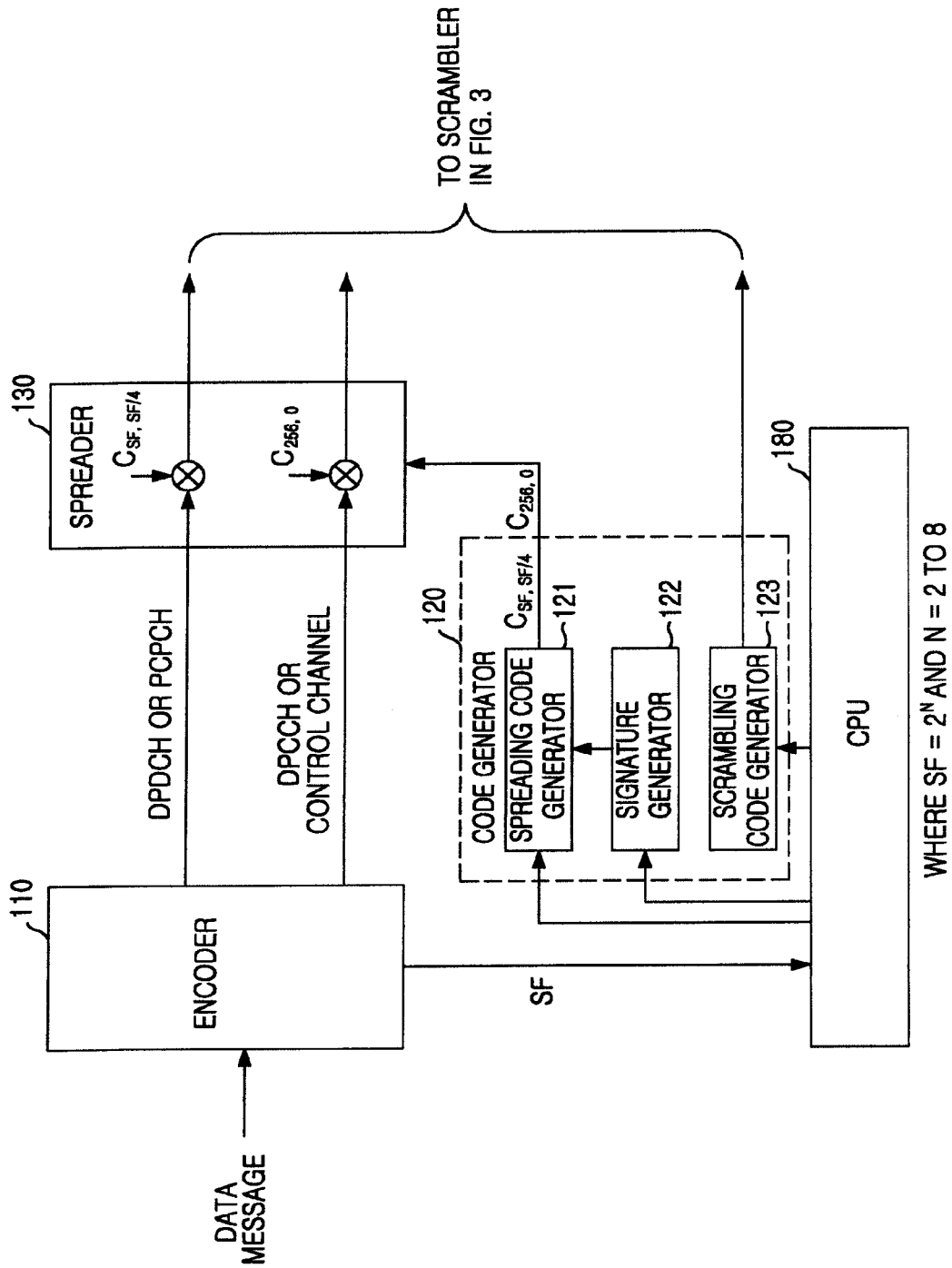
FIG. 5 is an exemplary diagram illustrating a case where a mobile station uses two channels.

Referring to FIG. 5, there is shown an exemplary diagram illustrating a case where a mobile station uses two channels.

As shown, when the mobile station uses the two channels and $SF=2^N$ where $N=2$ to 8, the spreading code generator 121 generates a spreading code of $C_{SF,\ SF/4}$ to be allocated to the DPDCH or the PCPCH as a data channel. Further, the spreading code generator 121 generates a spreading code of $C_{256,\ 0}$ to be allocated to the DPCCH or the control channel. Then, the spreader 130 spreads the DPDCH or the PCPCH by the spreading code of $C_{SF,\ SF/4}$. Further, The spreader 130 spreads the control channel by the spreading code of $C_{256,\ 0}$. At this time, the scrambling code generator 123 generates a complex-valued scrambling code assigned to the mobile station. Further, the complex-valued scrambling code can be temporarily reserved in the mobile station.

Figure 6:
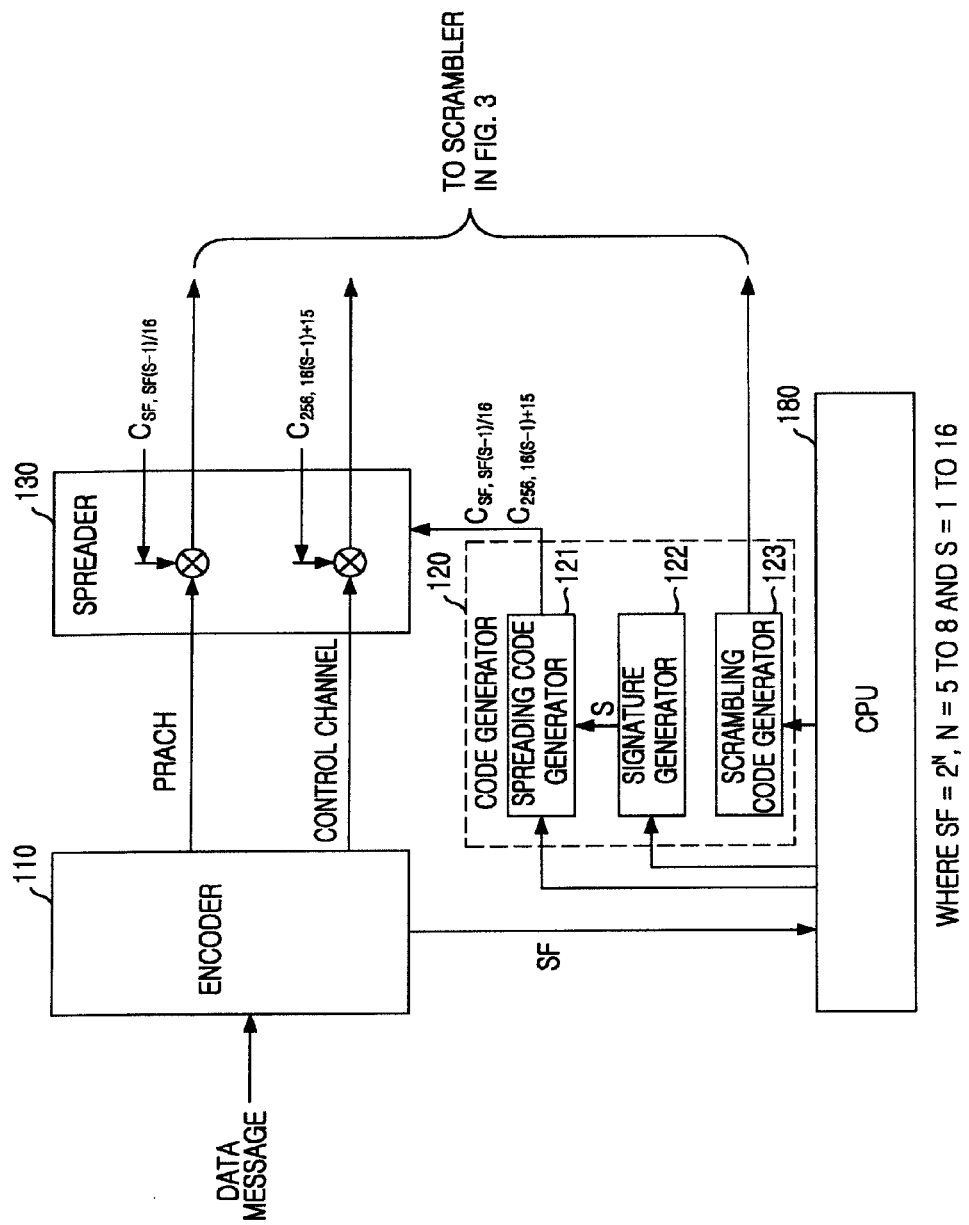
FIG. 6 is an exemplary diagram depicting a case where multiple mobile stations share a common complex-valued scrambling code.

Referring to FIG. 6, there is shown an exemplary diagram depicting a case where multiple mobile stations share a common complex-valued scrambling code in the PRACH application.

As shown, where the multiple mobile stations share a common complex-valued scrambling code and $SF=2^N$ where $N=5$ to 8 and $S=1$ to 16, the spreading code generator 121 generates a spreading code of $C_{SF,\ SF(S-1)/16}$ to be allocated to the PRACH. Further, the spreading code generator 121 generates a spreading code of $C_{256,\ 16(S-1)+15}$ to be allocated to the control channel.

Then, the spreader 130 spreads the PRACH by the spreading code of $C_{SF,\ SF(S-1)/16}$. Also, the spreader 130 spreads the control channel by the spreading code of $C_{256,\ 16(S-1)+15}$. At this time, the scrambling code generator 123 generates a common complex-valued scrambling code.

Figure 7:
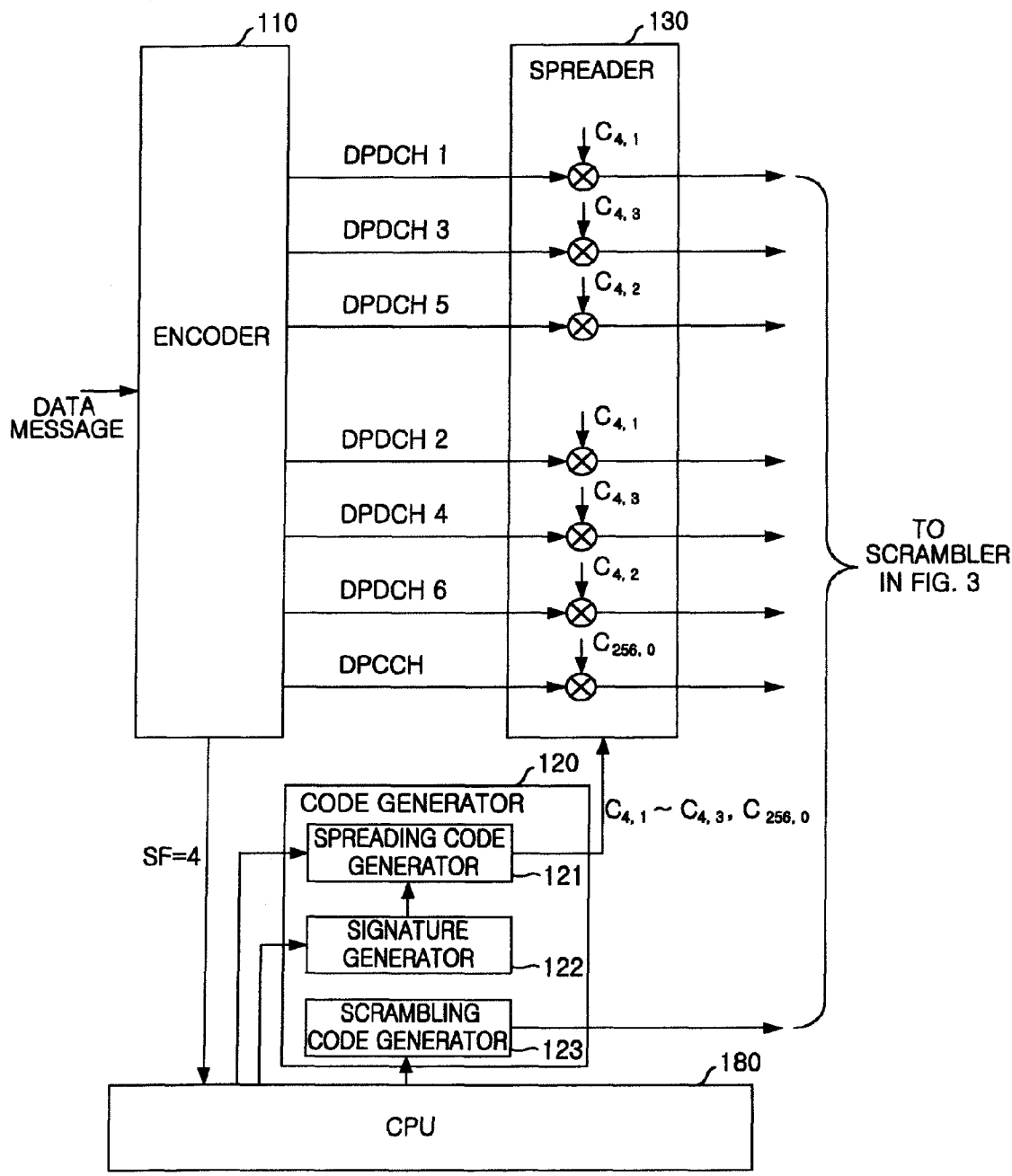
FIG. 7 is an exemplary diagram showing a case where a mobile station uses multiple channels.

Referring to FIG. 7, there is shown an exemplary diagram showing a case where a mobile station uses multiple channels. As shown, where the mobile station uses one control channel and two data channels and the SF related to the two data channels is 4, the spreading code generator 121 generates a spreading code of $C_{256,\ 0}$ to be allocated to the DPCCH. Further, the spreading code generator 121 generates a spreading code of $C_{4,\ 1}$ allocated to the DPDCH 1. Furthermore, the spreading code generator 121 generates a spreading code of $C_{4,\ 1}$ allocated to the DPDCH 2.

Then, the spreader 130 spreads the DPDCH 1 by the spreading code of $C_{4,\ 1}$. Further, the spreader 130 spreads the DPDCH 2 by the spreading code of $C_{4,\ 1}$. Furthermore, the spreader 130 spreads the DPCCH by the spreading code of $C_{256,\ 0}$. At this time, the scrambling code generator 123 generates a complex-valued scrambling codes assigned to the mobile station.

As shown, where the mobile station uses one control channel and three data channels and the SF related to the three data channels is 4, the spreading code generator 121 further generates a spreading code of $C_{4,\ 3}$ to be allocated to the DPDCH 3. Then, the spreader 130 further spreads the DPDCH 3 by the spreading code of $C_{4,\ 3}$.

As shown, where the mobile station uses one control channel and four data channels and the SF related to the four data channels is 4, the spreading code generator 121 further generates a spreading code of $C_{4,\ 3}$ to be allocated to the DPDCH 4. Then, the spreader 130 further spreads the DPDCH 4 by the spreading code of $C_{4,\ 3}$.

As shown, where the mobile station uses one control channel and five data channels and the SF related to the five data channels is 4, the spreading code generator 121 further generates a spreading code of $C_{4,\ 2}$ to be allocated to the DPDCH 5. Then, the spreader 130 further spreads the DPDCH 5 by the spreading code of $C_{4,\ 2}$.

As shown, where the two mobile station uses one control channel and six data channels and the SF related to the six data channels is 4, the spreading code generator 121 further generates a spreading code of $C_{4,\ 2}$ to be allocated to the DPDCH 6. Then, the spreader 130 further spreads the DPDCH 6 by the spreading code of $C_{4,\ 2}$.

Figure 8:
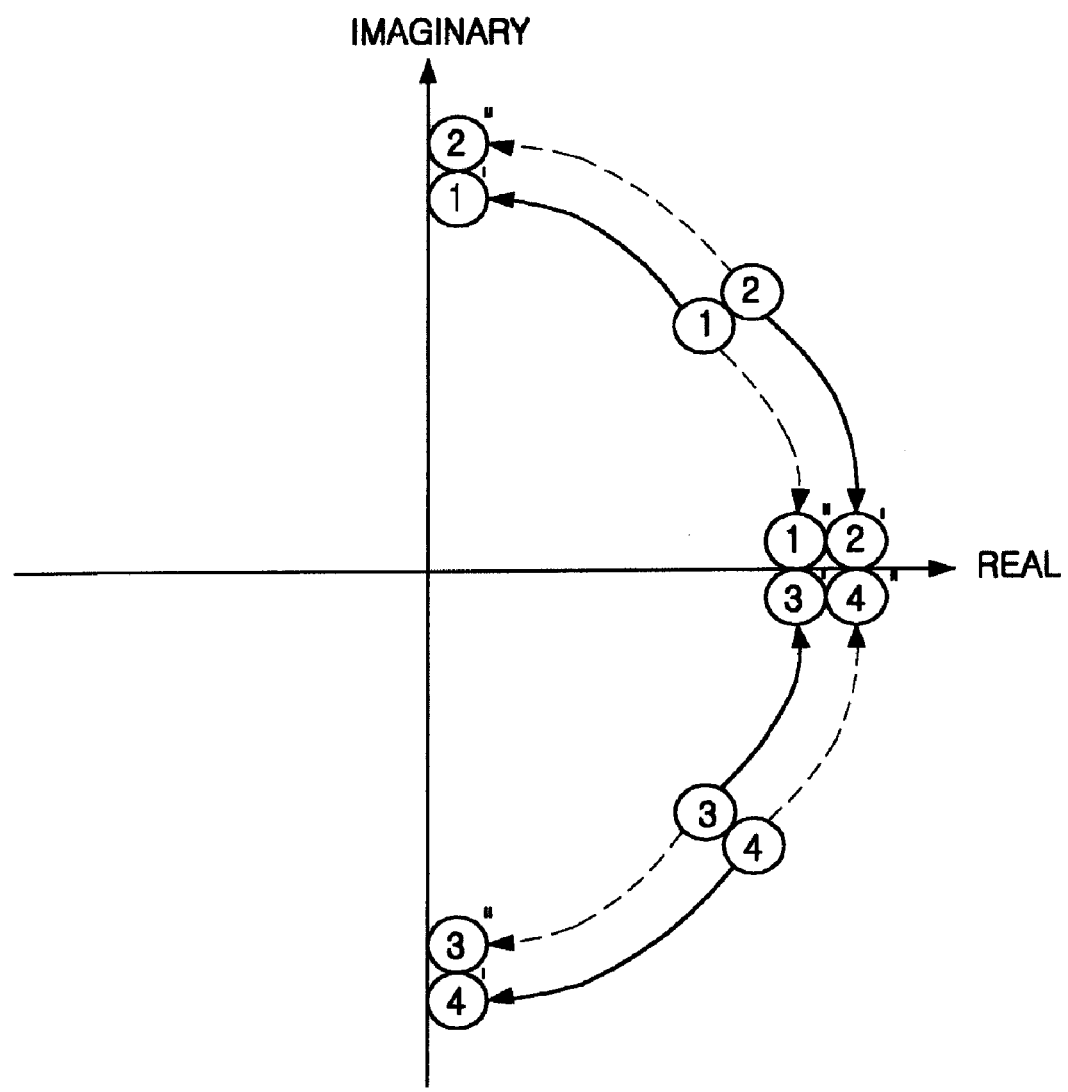
FIG. 8 is a first exemplary view describing a desirable phase difference between rotated points on a phase domain where a Walsh rotator rotates points at consecutive chips.

Referring to FIG. 8, there is shown a first exemplary view describing a desirable phase difference between rotated points on a phase domain where a Walsh rotator rotates points at consecutive chips.

As shown, in case where an SF is 4 and a code number is 0, a spreading code of $C_{4,\ 0}$ is represented by $\{1, 1, 1, 1\}$. Further, in case where the SF is 4 and a code number is 1, a spreading code of $C_{4,\ 1}$ is represented by $\{1, 1, -1, -1\}$.

Assume that two channels are spread by the spreading code of $C_{4,\ 0}=\{1, 1, 1, 1\}$ and the spreading code of $C_{4,\ 1}=\{1, 1, -1, -1\}$, respectively. At this time, real values contained in the spreading code of $C_{4,\ 0}=\{1, 1, 1, 1\}$ are represented by points on a real axis of a phase domain. Further, real values contained in the spreading code of $C_{4,\ 1}=\{1, 1, -1, -1\}$ are represented by points on an imaginary axis of the phase domain.

At a first or second chip, a point {1, 1}, i.e., a point ① or ②, is designated on the phase domain by first or second real values contained in the spreading codes of $C_{4,0}$ and $C_{4,1}$. At a third or fourth chip, a point {1, −1}, i.e., a point ③ or ④, is designated on the phase domain by third or fourth real values contained in the spreading codes of $C_{4,0}$ and $C_{4,1}$. The points ① and ② are positioned on the same point as each other. Also, the points ③ and ④ are positioned on the same point as each other. Where the Walsh rotator rotates the points at chips, the points are rotated by a predetermined phase, respectively.

For example, where the Walsh rotator rotates the point ① or ③ at an odd chip, the point ① or ③ is rotated to a clockwise direction by a phase of 45°. Further, where the Walsh rotator rotates the point ② or ④ at an even chip, the point ② or ④ is rotated to a counterclockwise direction by the phase of 45°. After rotating the points ① and ② or the points ③ and ④ at the odd and even chips as two consecutive chips, a phase difference between the rotated points ①' and ②' or the rotated points ③' and ④' becomes 90°. Where the phase difference between the rotated points ①' and ②' or the rotated points ③' and ④' becomes 90°, a peak-to-average power ratio (PAPR) of a mobile station can be reduced.

For another example, where the Walsh rotator rotates the point ① or ③ at an odd chip, the point ① or ③ is rotated to the counterclockwise direction by the phase of 45°. Further, where the Walsh rotator rotates the point ② or ④ at an even chip, the point ② or ④ is rotated to the clockwise direction by the phase of 45°. After rotating the points ① and ② or the points ③ and ④ at the odd and even chips as two consecutive chips, a phase difference between the rotated points ①" and ②" or the rotated points ③" and ④" becomes 90°. Where the phase difference between the rotated points ①" and ②" or the rotated points ③" and ④" becomes 90°, the peak-to-average power ratio of the mobile station can be reduced.

Figure 9:
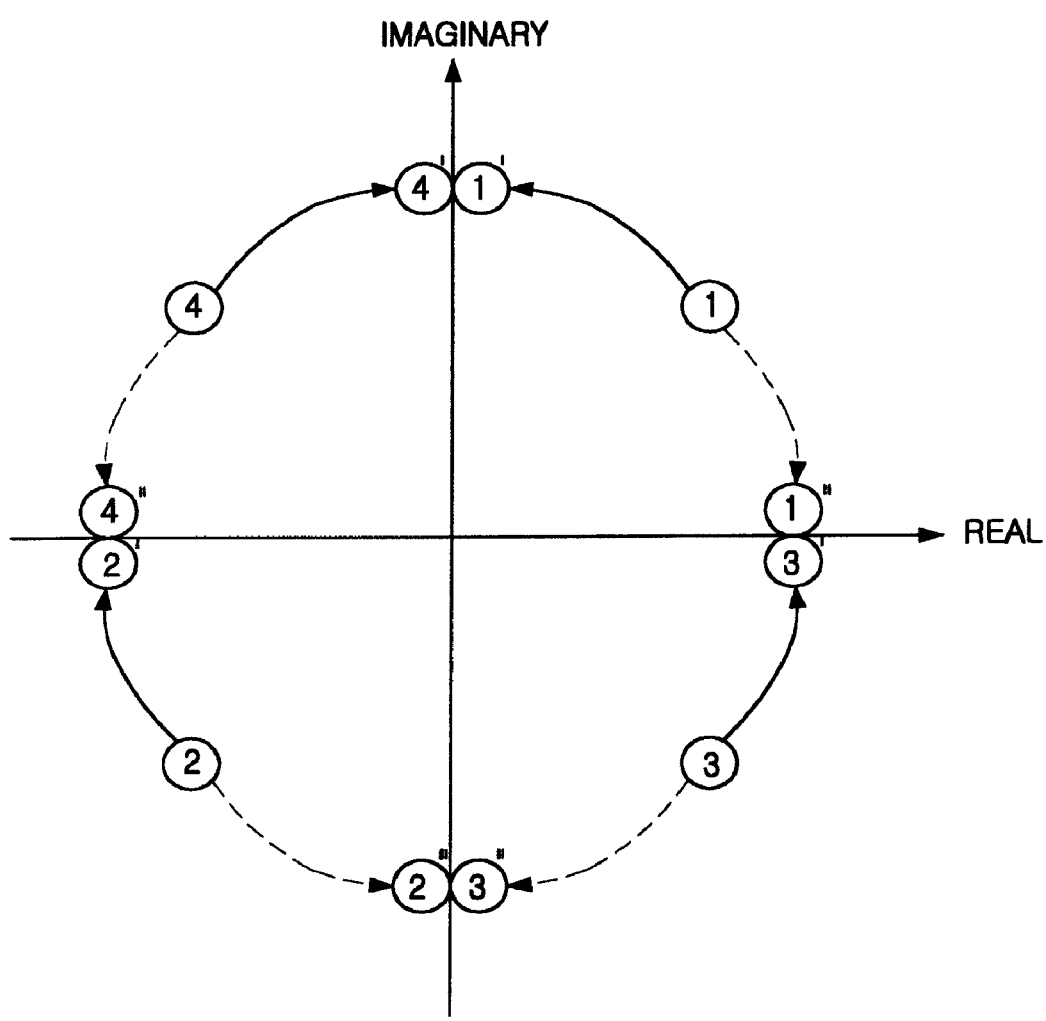
FIG. 9 is a second exemplary view showing a desirable phase difference between rotated points on a phase domain where a Walsh rotator rotates points at consecutive chips.

Referring to FIG. 9, there is shown a second exemplary view showing a desirable phase difference between rotated points on a phase domain where a Walsh rotator rotates points at consecutive chips.

First, assume that two channels are spread by a spreading code of $C_{4,2}$={1, −1, 1, −1} and a spreading code of $C_{4,3}$={1, −1, −1, 1}, respectively.

At a first chip, a point {1, 1}, i.e., a point ①, is designated on the phase domain by first real values contained in the spreading codes of $C_{4,2}$ and $C_{4,3}$. At a second chip, a point {−1, −1}, i.e., a point ②, is designated on the phase domain by second real values contained in the spreading codes of $C_{4,2}$ and $C_{4,3}$. The points ① and ② are symmetrical with respect to a zero point as a center point on the phase domain.

At a third chip, a point {1, −1}, i.e., a point ③, is designated on the phase domain by third real values contained in the spreading codes of $C_{4,2}$ and $C_{4,3}$. At a fourth chip, a point {−1, 1}, i.e., a point ④, is designated on the phase domain by fourth real values contained in the spreading codes of $C_{4,2}$ and $C_{4,3}$. The points ③ and ④ are symmetrical with respect to the zero point on the phase domain. Where the Walsh rotator rotates the points at chips, the points are rotated by a predetermined phase, respectively.

For example, where the Walsh rotator rotates the point ① or ③ at an odd chip, the point ① or ③ is rotated to a clockwise direction by a phase of 45°. Further, where the Walsh rotator rotates the point ② or ④ at an even chip, the point ② or ④ is rotated to a counterclockwise direction by the phase of 45°. After rotating the points ① and ② or the points ③ and ④ at the odd and even chips as two consecutive chips, a phase difference between the rotated points ①' and ②' or the rotated points ③' and ④' becomes 90°. Where the phase difference between the rotated points ①' and ②' or the rotated points ③' and ④' becomes 90°, a peak-to-average power ratio of a mobile station can be reduced.

For another example, where the Walsh rotator rotates the point ① or ③ at an odd chip, the point ① or ③ is rotated to the counterclockwise direction by the phase of 45°. Further, where the Walsh rotator rotates the point ② or ④ at an even chip, the point ② or ④ is rotated to the clockwise direction by the phase of 45°. After rotating the points ① and ② or the points ③ and ④ at the odd and even chips as two consecutive chips, a phase difference between the rotated points ①" and ②" or the rotated points ③" and ④" becomes 90°. Where the phase difference between the rotated points ①" and ②" or the rotated points ③" and ④" becomes 90°, the peak-to-average power ratio of the mobile station can be reduced.

Figure 10:
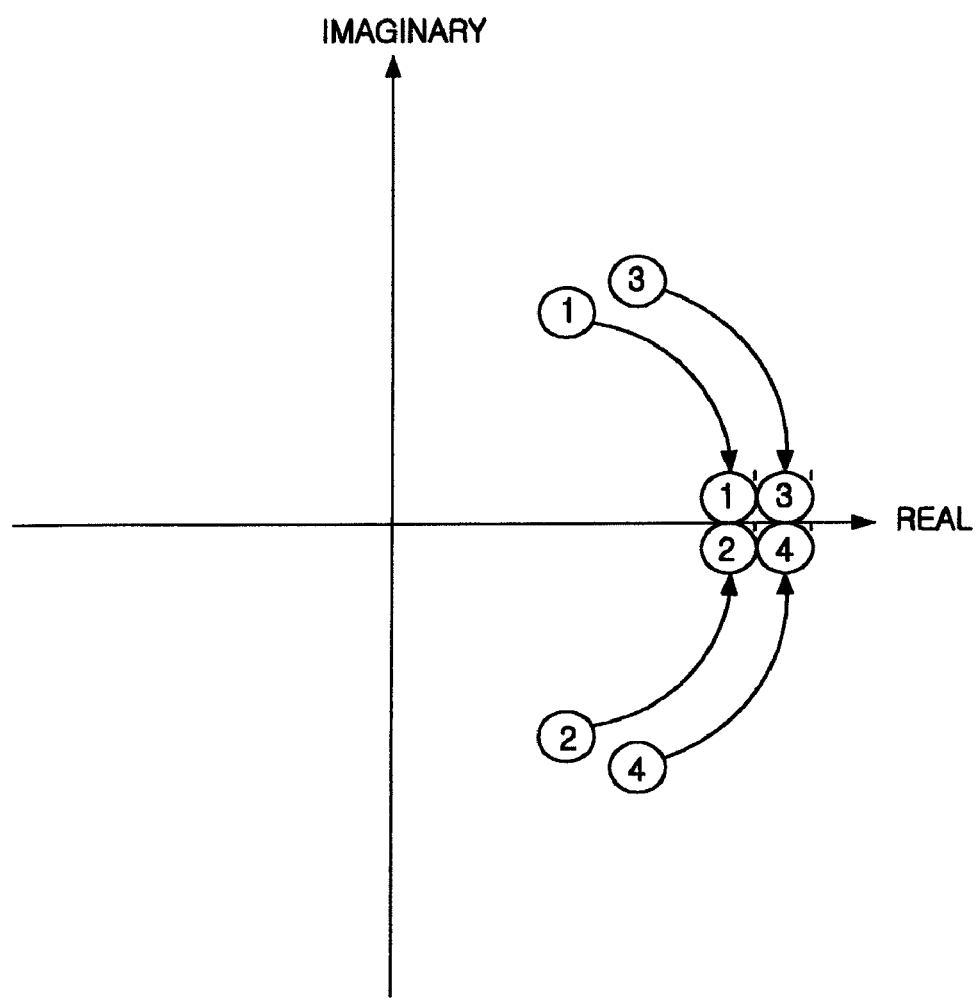
FIG. 10 is a first exemplary view depicting an undesirable phase difference between rotated points on a phase domain where a Walsh rotator rotates points at consecutive chips.

Referring to FIG. 10, there is shown a first exemplary view depicting an undesirable phase difference between rotated points on a phase domain where a Walsh rotator rotates points at consecutive chips.

First, assume that two channels are spread by the spreading code of $C_{4,0}$={1, 1, 1, 1} and the spreading code of $C_{4,2}$={1, −1, 1, −1}, respectively.

At a first chip, a point {1, 1}, i.e., a point ①, is designated on the phase domain by first real values contained in the spreading codes of $C_{4,0}$ and $C_{4,2}$. At a second chip, a point {1, −1}, i.e., a point ②, is designated on the phase domain by second real values contained in the spreading codes of $C_{4,0}$ and $C_{4,2}$. The points ① and ② are symmetrical with respect to the real axis on the phase domain.

At a third chip, a point {1, 1}, i.e., a point ③, is designated on the phase domain by third real values contained in the spreading codes of $C_{4,0}$ and $C_{4,2}$. At a fourth chip, a point {1, −1}, i.e., a point ④, is designated on the phase domain by fourth real values contained in the spreading codes of $C_{4,0}$ and $C_{4,2}$. The points ③ and ④ are symmetrical with respect to the real axis on the phase domain. Where the Walsh rotator rotates the points at chips, the points are rotated by a predetermined phase, respectively.

For example, where the Walsh rotator rotates the point ① or ③ at an odd chip, the point ① or ③ is rotated to a counterclockwise direction by a phase of 45°. Further, where the Walsh rotator rotates the point ② or ④ at an even chip, the point ② or ④ is rotated to a clockwise direction by the phase of 45°. After rotating the points ① and ② or the points ③ and ④ at the odd and even chips as two consecutive chips, a phase difference between the rotated points ①' and ②' or the rotated points ③' and ④' becomes zero. Where the phase difference between the rotated points ①' and ②' or the rotated points ③' and ④' does not become 90°, a peak-to-average power ratio of a mobile station can not be reduced.

Figure 11:
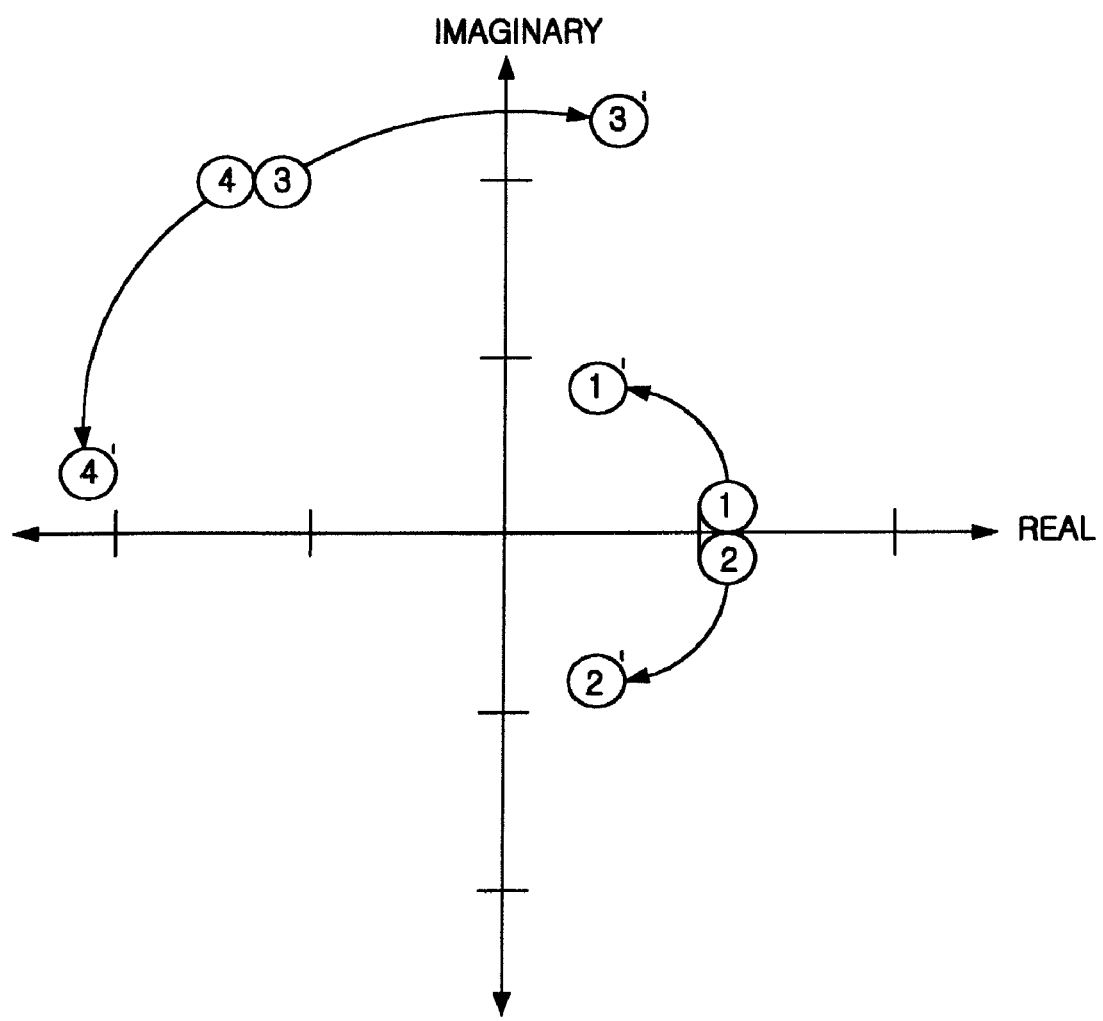
FIGS. 11 and 12 are third exemplary views illustrating a desirable phase difference between rotated points on a phase domain where a Walsh rotator rotates points at consecutive chips.
Figure 12:
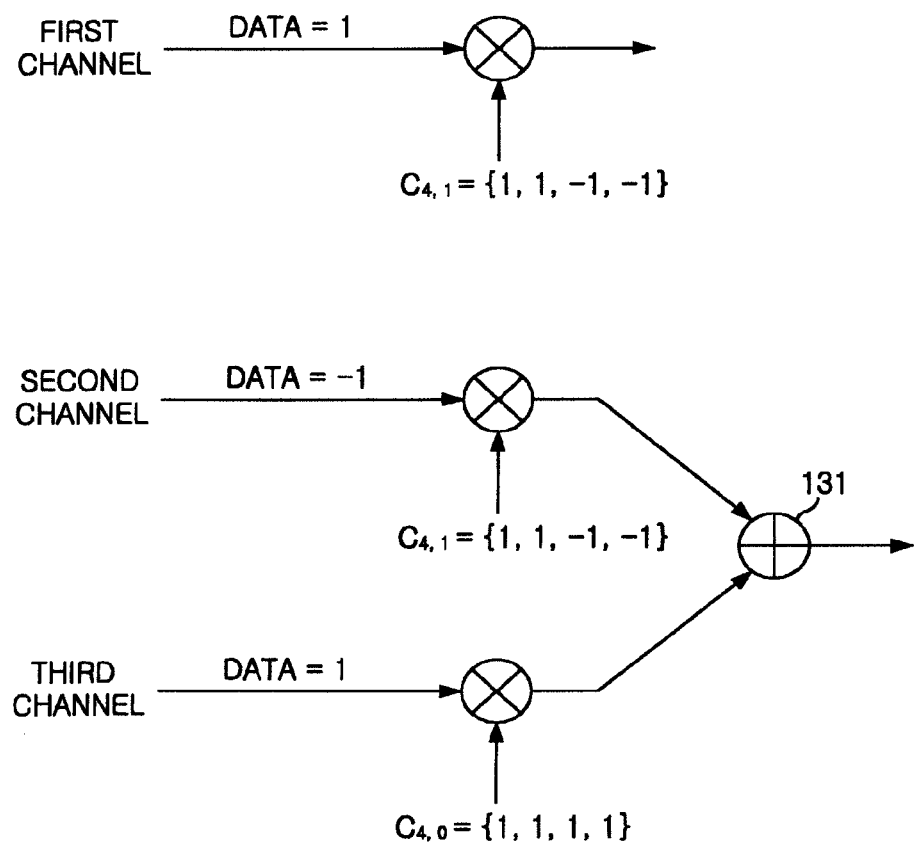

Referring to FIGS. 11 and 12, there are shown third exemplary views illustrating a desirable phase difference between rotated points on a phase domain where a Walsh rotator rotates points at consecutive chips.

First, assume that data of 1 allocated to a first channel is spread by a spreading code of $C_{4,1}$={1, 1, −1, −1}. Further, assume that data of −1 allocated to a second channel is spread by a spreading code of $C_{4,1}$={1, 1, −1, −1}. Furthermore, assume that data of 1 allocated to a third channel is spread by a spreading code of $C_{4,0}$={1, 1, 1, 1}.

In terms of the first channel, the spreader 130 shown in FIG. 3 multiplies the data of 1 by the spreading code of $C_{4,1}$={1, 1, −1, −1}, thereby generating a code of {1, 1, −1, −1}. Further, in terms of the second channel, the spreader 130 multiplies the data of −1 by the spreading code of $C_{4,1}$={1, 1, −1, −1}, thereby generating a code of {−1, −1, 1, 1}. Furthermore, in terms of the third channel, the spreader 130 multiplies the data of 1 by the spreading code of $C_{4,0}=\{1, 1, 1, 1\}$, thereby generating a code of $\{1, 1, 1, 1\}$.

Where the spreader 130 includes an adder 131 shown in FIG. 12, the adder 131 generates a code of $\{0, 0, 2, 2\}$ by adding the code of $\{-1, -1, 1, 1\}$ to the code of $\{1, 1, 1, 1\}$.

TABLE 1

| Chip | 1 | 2 | 3 | 4 |
|---|---|---|---|---|
| First Channel | 1 | 1 | −1 | −1 |
| Second Channel | −1 | −1 | 1 | 1 |
| Third Channel | 1 | 1 | 1 | 1 |
| Second channel + Third channel | 0 | 0 | 2 | 2 |

Table 1 represents the spreading codes allocated to three channels and a sum of two channels depending upon chips. At a first or second chip, a point $\{1, 0\}$, i.e., a point ① or ②, is designated on the phase domain by first or second real values contained in the code of $\{1, 1, -1, -1\}$ and the code of $\{0, 0, 2, 2\}$. At a third or fourth chip, a point $\{-1, 2\}$, i.e., a point ③ or ④, is designated on the phase domain by third or fourth real values contained in the code of $\{1, 1, -1, -1\}$ and the code of $\{0, 0, 2, 2\}$. The points ① and ② are positioned on the same point as each other. Also, the points ③ and ④ are positioned on the same point as each other. Where the Walsh rotator rotates the points at chips, the points are rotated by a predetermined phase, respectively.

For example, where the Walsh rotator rotates the point ① or ③ at an odd chip, the point ① or ③ is rotated to a clockwise direction by a phase of 45°. Further, where the Walsh rotator rotates the point ② or ④ at an even chip, the point ② or ④ is rotated to a counterclockwise direction by the phase of 45°. After rotating the points ① and ② or the points ③ and ④ at the odd and even chips as two consecutive chips, a phase difference between the rotated points ①' and ②' or the rotated points ③' and ④' becomes 90°. Where the phase difference between the rotated points ①' and ②' or the rotated points ③' and ④' becomes 90°, a peak-to-average power ratio of a mobile station can be reduced.

Figure 13:
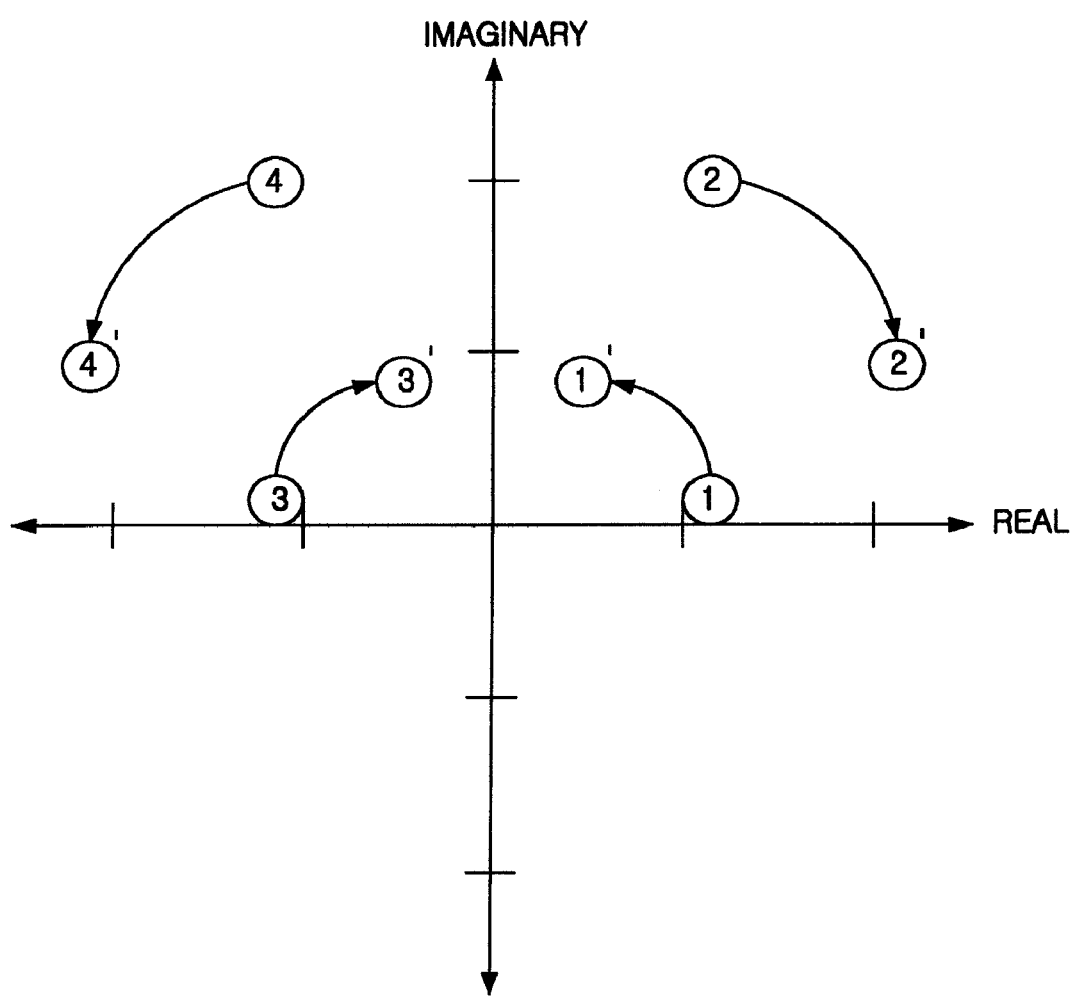
FIGS. 13 and 14 are second exemplary views illustrating an undesirable phase difference between rotated points on a phase domain where a Walsh rotator rotates points at consecutive chips.
Figure 14:
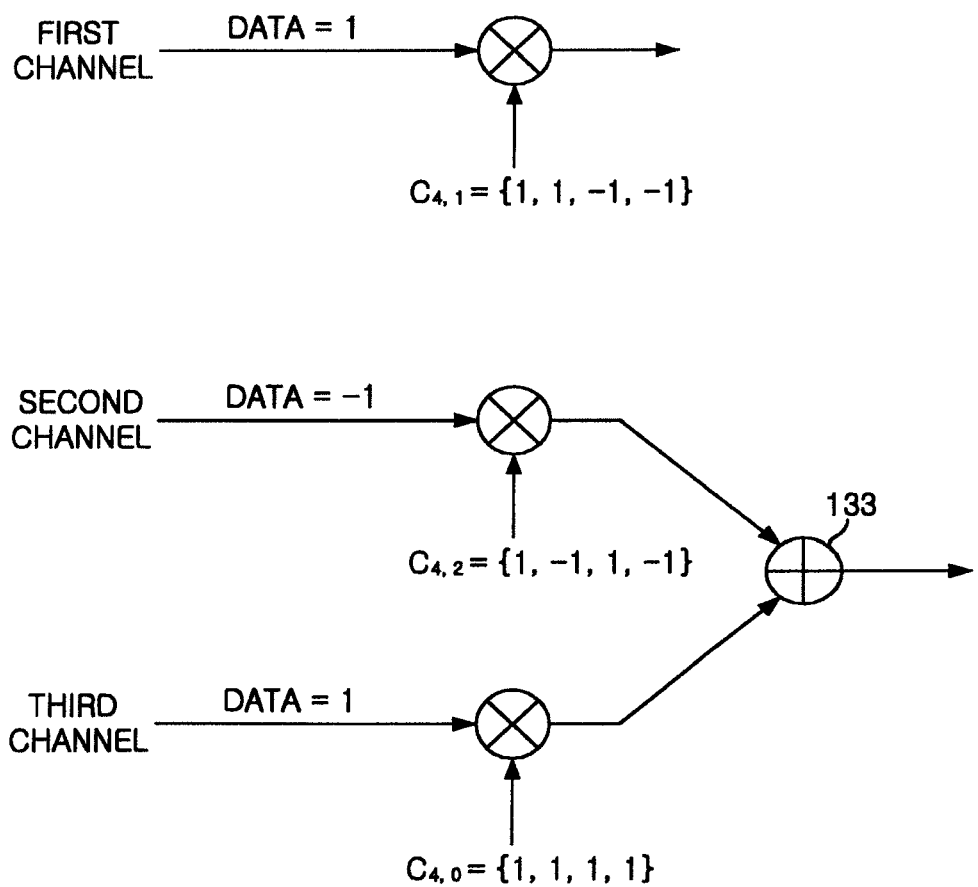

Referring to FIGS. 13 and 14, there are shown second exemplary views illustrating an undesirable phase difference between rotated points on a phase domain where a Walsh rotator rotates points at consecutive chips.

First, assume that data of 1 allocated to a first channel is spread by a spreading code of $C_{4,1}=\{1, 1, -1, -1\}$. Further, assume that data of −1 allocated to a second channel is spread by a spreading code of $C_{4,2}=\{1, -1, 1, -1\}$. Furthermore, assume that data of 1 allocated to a third channel is spread by a spreading code of $C_{4,0}=\{1, 1, 1, 1\}$.

In terms of the first channel, the spreader 130 shown in FIG. 2 multiplies the data of 1 with the spreading code of $C_{4,1}=\{1, 1, -1, -1\}$, thereby generating a code of $\{1, 1, -1, -1\}$. Further, in terms of the second channel, the spreader 130 multiplies the data of −1 by the spreading code of $C_{4,2}=\{1, -1, 1, -1\}$, thereby generating a code of $\{-1, 1, -1, 1\}$. Furthermore, in terms of the third channel, the spreader 130 multiplies the data of 1 by the spreading code of $C_{4,0}=\{1, 1, 1, 1\}$, thereby generating a code of $\{1, 1, 1, 1\}$.

Where the spreader 130 includes an adder 133 shown in FIG. 14, the adder 133 generates a code of $\{0, 2, 0, 2\}$ by adding the code of $\{-1, 1, -1, 1\}$ to the code of $\{1, 1, 1, 1\}$.

TABLE 2

| Chip | 1 | 2 | 3 | 4 |
|---|---|---|---|---|
| First Channel | 1 | 1 | −1 | −1 |
| Second Channel | −1 | 1 | −1 | 1 |
| Third Channel | 1 | 1 | 1 | 1 |
| Second channel + third channel | 0 | 2 | 0 | 2 |

Table 2 represents the spreading codes allocated to three channels and a sum of two channels depending upon chips. At a first chip, a point $\{1, 0\}$, i.e., a point ①, is designated on the phase domain by first real values contained in the code of $\{1, 1, -1, -1\}$ and the code of $\{0, 2, 0, 2\}$. At a second chip, a point $\{1, 2\}$, i.e., a point ②, is designated on the phase domain by second real values contained in the code of $\{1, 1, -1, -1\}$ and the code of $\{0, 2, 0, 2\}$. At a third chip, a point $\{-1, 0\}$, i.e., a point ③, is designated on the phase domain by third real values contained in the code of $\{1, 1, -1, -1\}$ and the code of $\{0, 2, 0, 2\}$. At a fourth chip, a point $\{-1, 2\}$, i.e., a point ④, is designated on the phase domain by third real values contained in the code of $\{1, 1, -1, -1\}$ and the code of $\{0, 2, 0, 2\}$.

The points ① and ② or the points ③ and ④ are positioned on different points from each other. Where the Walsh rotator rotates the points at chips, the points are rotated by a predetermined phase, respectively.

For example, where the Walsh rotator rotates the point ① or ③ at an odd chip, the point ① or ③ is rotated to a clockwise direction by a phase of 45°. Further, where the Walsh rotator rotates the point ② or ④ at an even chip, the point ② or ④ is rotated to a counterclockwise direction by the phase of 45°. After rotating the points ③ and ④ at the odd and even chips as two consecutive chips, a phase difference between the rotated points ③' and ④' does not become 90°. Where the phase difference between the rotated points ③' and ④' does not become 90°, a peak-to-average power ratio of a mobile station can increase.

Further, after rotating the points ① and ② at the odd and even chips as two consecutive chips, a phase difference between the rotated points ①' and ②' does not become 90°. Where the phase difference between the rotated points ①' and ②' does not become 90°, the peak-to-average power ratio of a mobile station can increase.

Figure 15:
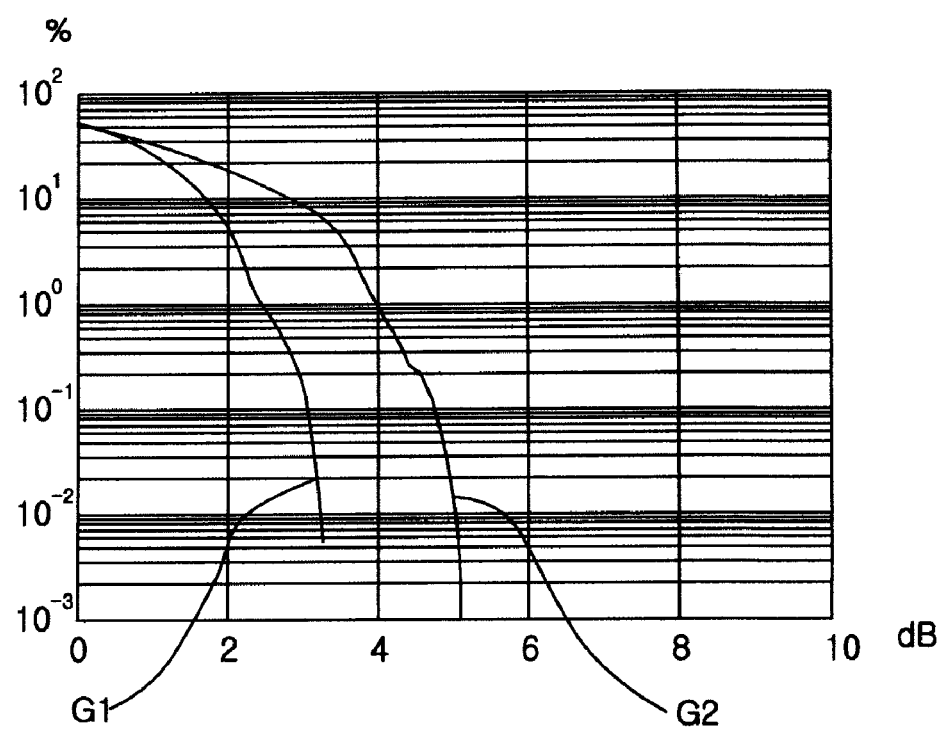
FIG. 15 is a graphical diagram describing the probability of peak power to average power.

Referring to FIG. 15, there is shown an exemplary graphical diagram describing the probability of peak to average power.

When a mobile station employs two channels and spreading codes of $C_{4,0}=\{1, 1, 1, 1\}$ and $C_{4,1}=\{1, 1, -1, -1\}$ allocated to the two channels, a curve G1 is shown in the graphical diagram. At this time, the probability of the peak power exceeding the average power by 2.5 dB is approximately 1%.

Further, when a mobile station employs two channels and spreading codes of $C_{4,0}=\{1, 1, 1, 1\}$ and $C_{4,2}=\{1, -1, 1, -1\}$ allocated to the two channels, a curve G2 is shown in the graphical diagram. At this time, the probability of the peak power exceeding the average power by 2.5 dB is approximately 7%.

Figure 16:
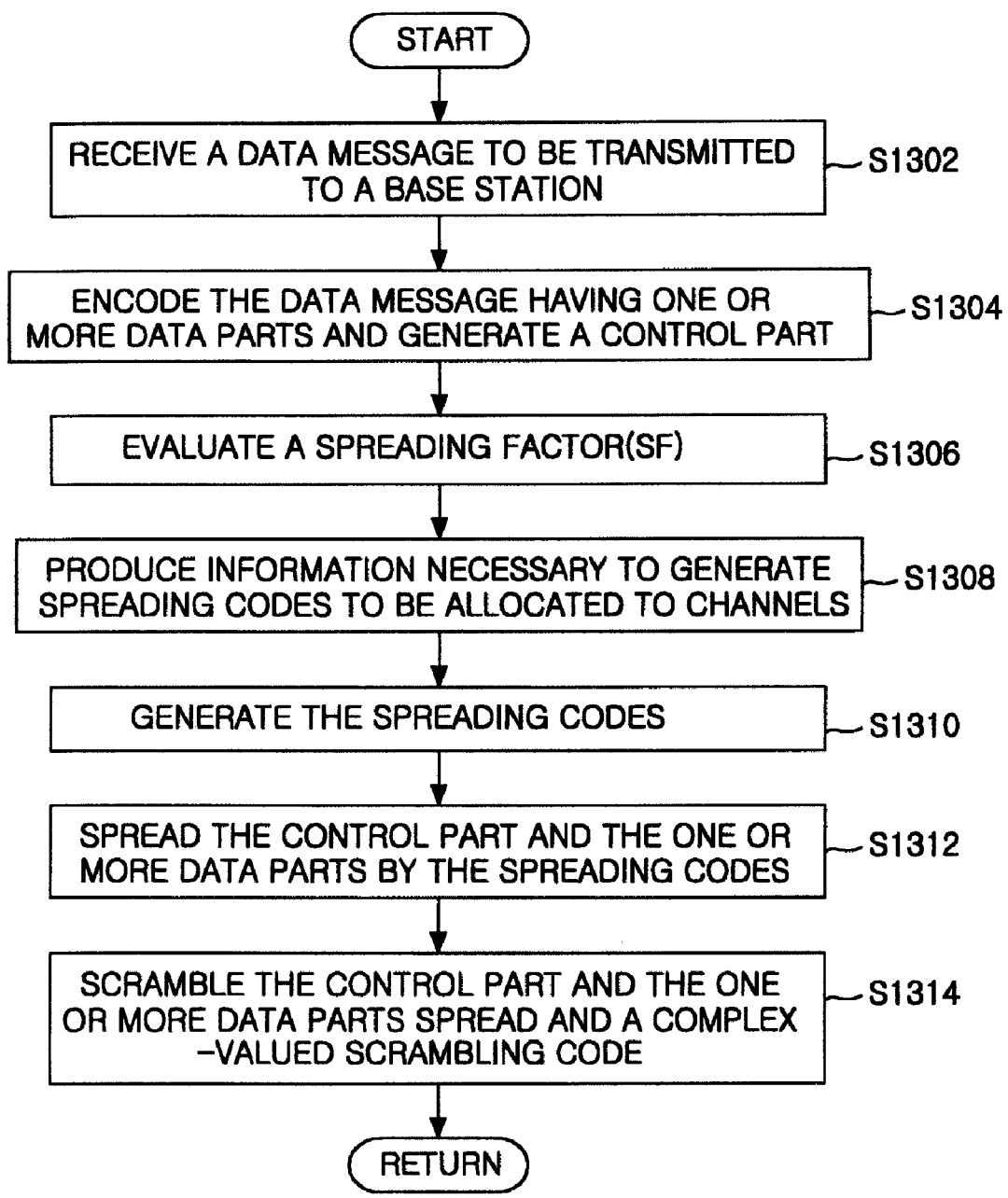
FIGS. 16 to 22 are flowcharts illustrating a method for modulating a data message in a mobile station in accordance with the present invention.

Referring to FIG. 16, there is shown a flowchart depicting a method for modulating a data message in a mobile station in accordance with the present invention.

As shown, at step S1302, an encoder receives a data message to be transmitted to a base station.

At step S1304, the encoder encodes the data message having one or more data parts and generates a control part.

At step S1306, the encoder evaluates an SF related to the one or more data parts to send the SF from an encoder to a CPU.

At step S1308, the CPU produces information necessary to generate spreading codes to be allocated to channels.

At step S1310, a code generator generates the spreading codes.

At step S1312, a spreader spreads the control part and the one or more data parts by the spreading codes.

At step S1314, a scrambler scrambles the control part and the one or more data parts spread and a complex-valued scrambling code, to thereby generate a channel-modulated signal having a plurality of pairs of in-phase (I) and quadrature-phase (Q) data in the mobile station.

Figure 17:
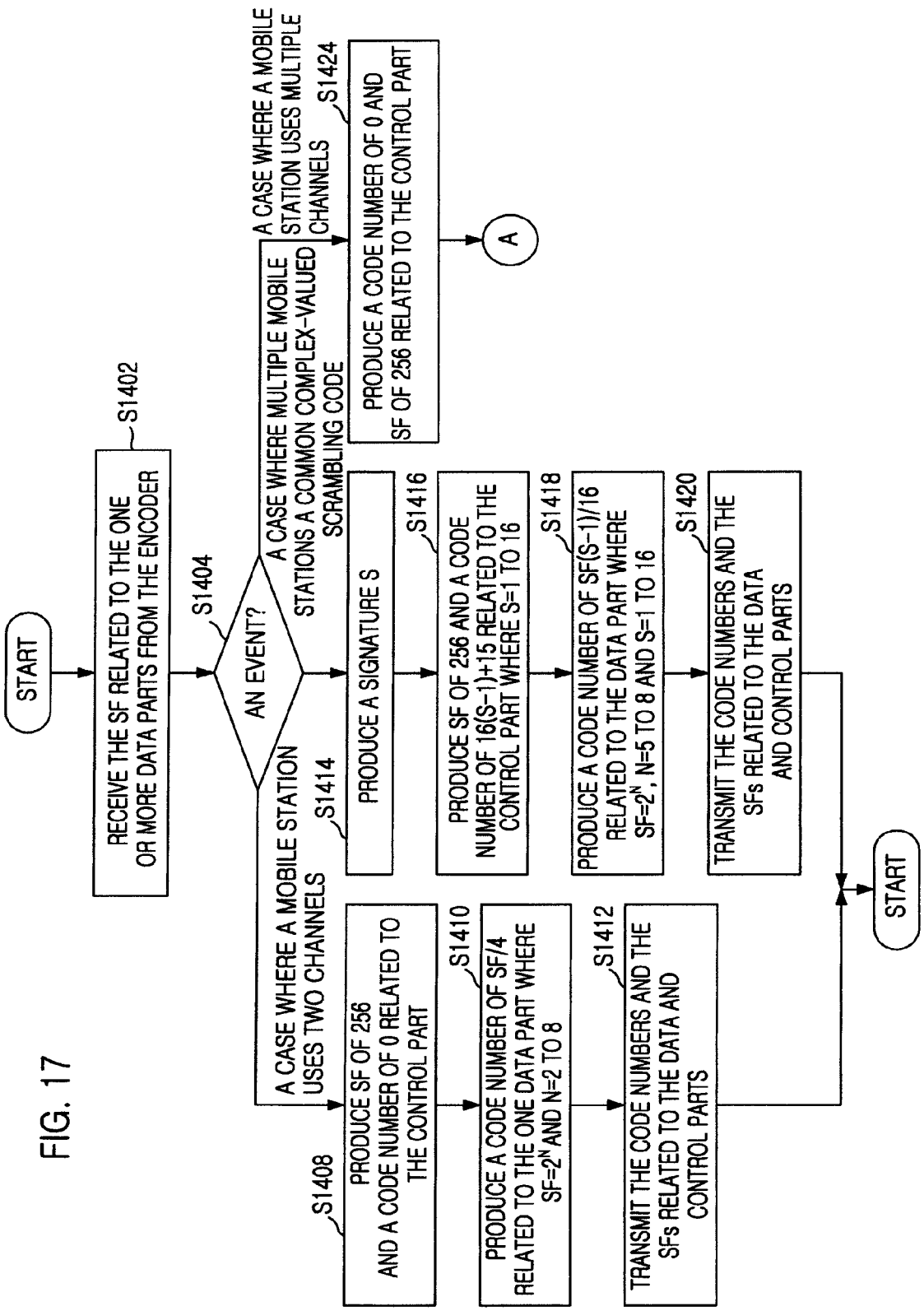
Figure 18:
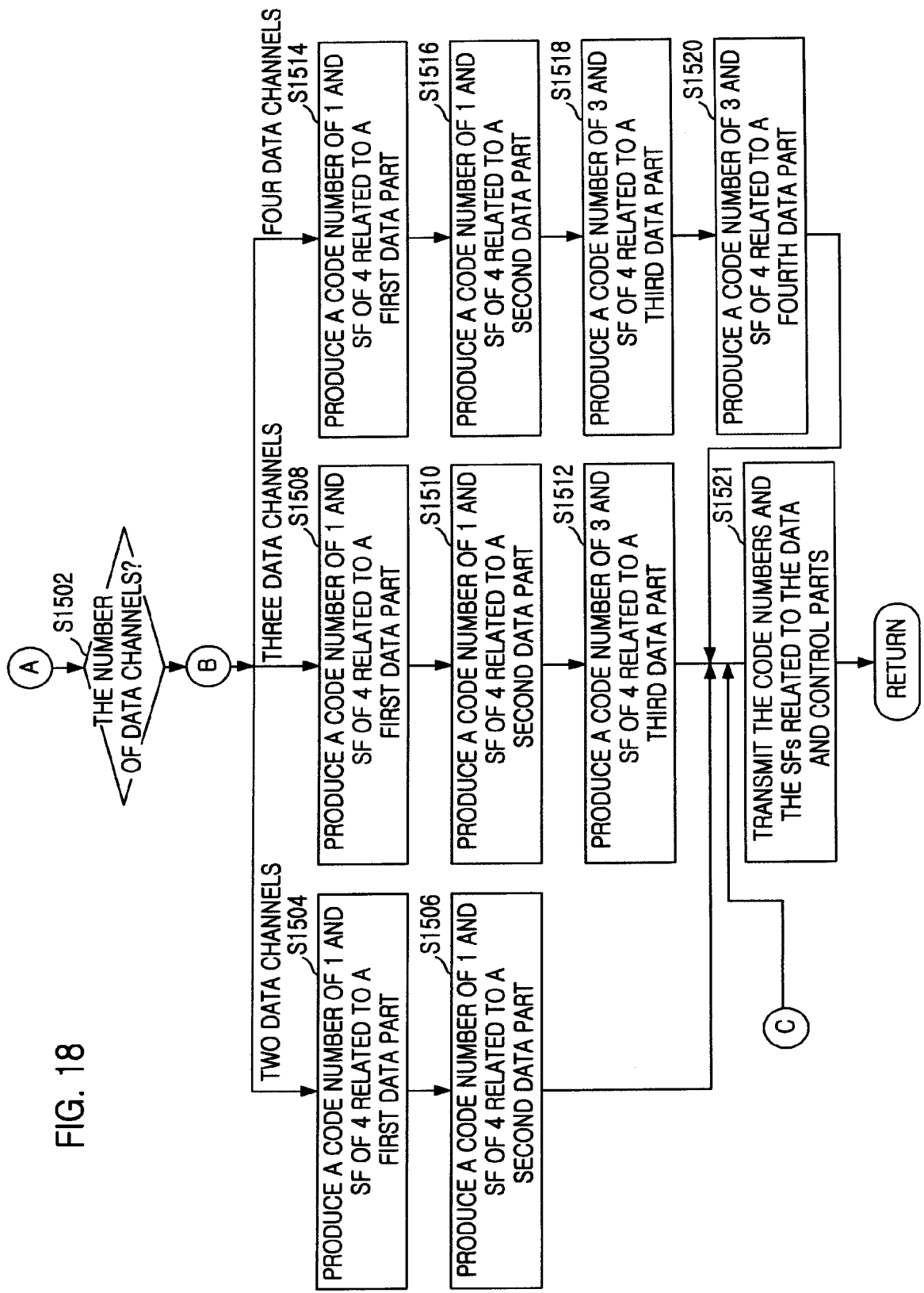
Figure 19:
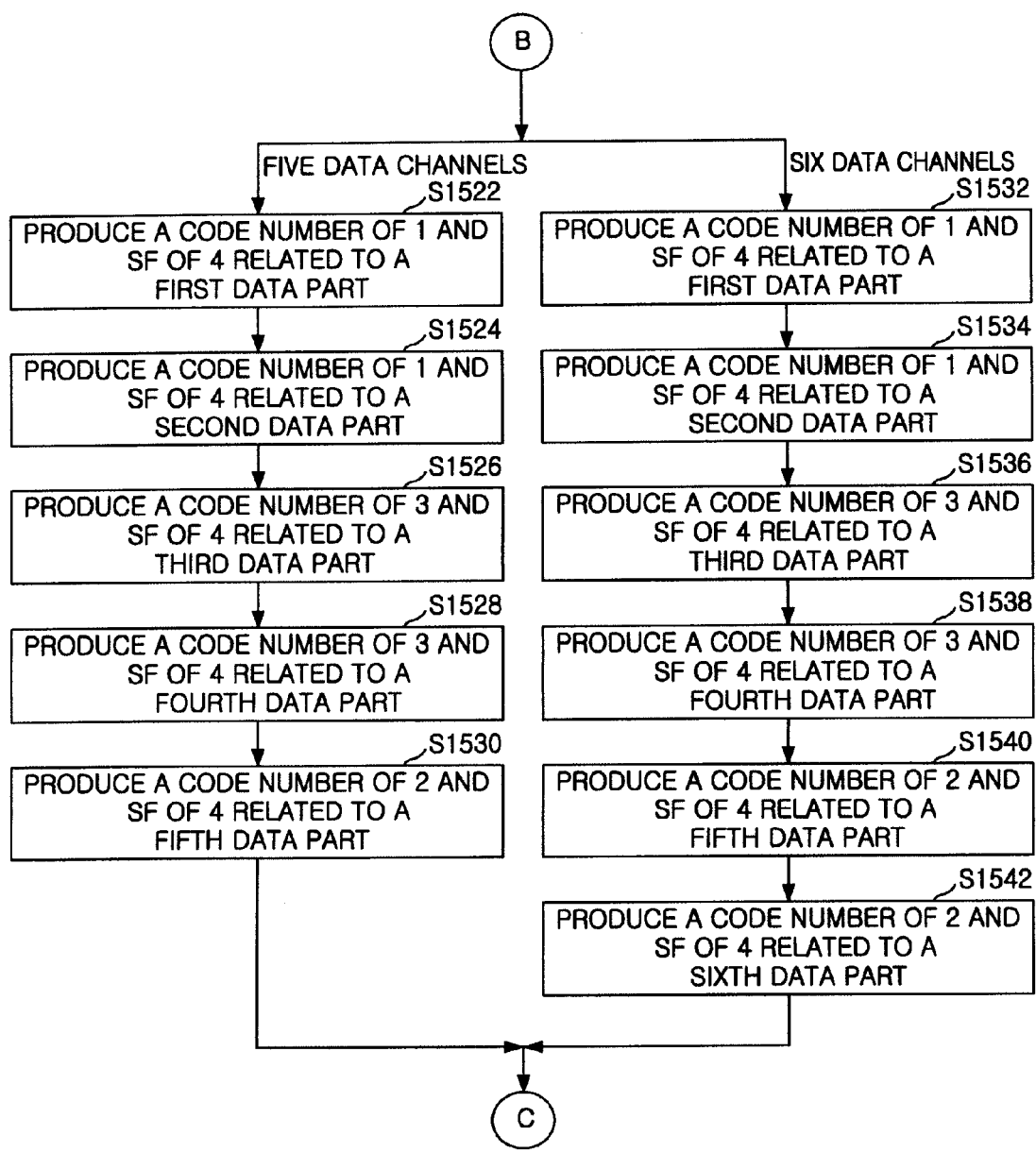

Referring to FIGS. 17 to 19, there are flowcharts illustrative of a procedure for producing information necessary to generate spreading codes to be allocated to channels.

As shown, at step S1402, the CPU receives the SF related to the one or more data parts from the encoder.

At step S1404, the CPU determines a type of an event.

At step S1408, if the event is a case where a mobile station uses two channels, the CPU produces an SF of 256 and a code number of 0 related to the control part.

At step S1410, the CPU produces a code number of SF/4 related to the one data part where $SF=2^N$ and N=2 to 8.

At step S1412, the CPU sends the code numbers and the SFs related to the data and control parts to the code generator.

On the other hand, at step S1414, if the event is a case where multiple mobile stations share a common complex-valued scrambling code, the CPU produces a signature S.

At step S1416, the CPU produces the SF of 256 and a code number of 16(S−1)+15 related to the control part where S=1 to 16.

At step S1418, the CPU produces a code number of SF(S−1)/16 related to the one data part where $SF=2^N$, N=2 to 8 and S=1 to 16.

At step S1420, the CPU sends the code numbers and the SFs related to the data and control parts to the code generator.

On the other hand, at step S1424, if the event is a case where a mobile station uses multiple channels, the CPU produces a code number of 0 and the SF of 256 related to the control part allocated to the control channel.

At step S1502, the CPU determines the number of data channels.

At step S1504, if the number of data channels is two data channels, the CPU produces a code number of 1 and an SF of 4 related to a first data part allocated to a first data channel coupled to an I branch.

At step S1506, the CPU produces a code number of 1 and the SF of 4 related to a second data part allocated to a second data channel.

On the other hand, at step S1508, if the number of data channels is three data channels, the CPU produces the code number of 1 and the SF of 4 related to the first data part allocated to the first data channel.

At step S1510, the CPU produces the code number of 1 and the SF of 4 related to the second data part allocated to the second data channel.

At step S1512, the CPU produces a code number of 3 and the SF of 4 related to the third data part allocated to the third data channel.

On the other hand, at step S1514, if the number of data channels is four data channels, the CPU produces the code number of 1 and the SF of 4 related to the first data part allocated to the first data channel.

At step S1516, the CPU produces the code number of 1 and the SF of 4 related to the second data part allocated to the second data channel.

At step S1518, the CPU produces the code number of 3 and the SF of 4 related to the third data part allocated to the third data channel.

At step S1520, the CPU produces the code number of 3 and the SF of 4 related to a fourth data part allocated to a fourth data channel.

On the other hand, at step S1522, if the number of data channels is five data channels, the CPU produces the code number of 1 and the SF of 4 related to the first data part allocated to the first data channel.

At step S1524, the CPU produces the code number of 1 and the SF of 4 related to the second data part allocated to the second data channel.

At step S1526, the CPU produces the code number of 3 and the SF of 4 related to the third data part allocated to the third data channel.

At step S1528, the CPU produces the code number of 3 and the SF of 4 related to the fourth data part allocated to the fourth data channel.

At step S1530, the CPU produces the code number of 2 and the SF of 4 related to a fifth data part allocated to a fifth data channel.

On the other hand, at step S1532, if the number of data channels is six data channels, the CPU produces the code number of 1 and the SF of 4 related to the first data part allocated to the first data channel.

At step S1534, the CPU produces the code number of 1 and the SF of 4 related to the second data part allocated to the second data channel.

At step S1536, the CPU produces the code number of 3 and the SF of 4 related to the third data part allocated to the third data channel.

At step S1538, the CPU produces the code number of 3 and the SF of 4 related to the fourth data part allocated to the fourth data channel.

At step S1540, the CPU produces the code number of 2 and the SF of 4 related to the fifth data part allocated to the fifth data channel.

At step S1542, the CPU produces the code number of 2 and the SF of 4 related to a sixth data part allocated to a sixth data channel.

At step S1521, the CPU transmits the code numbers and the SFs related to the data and control parts to the code generator.

Figure 20:
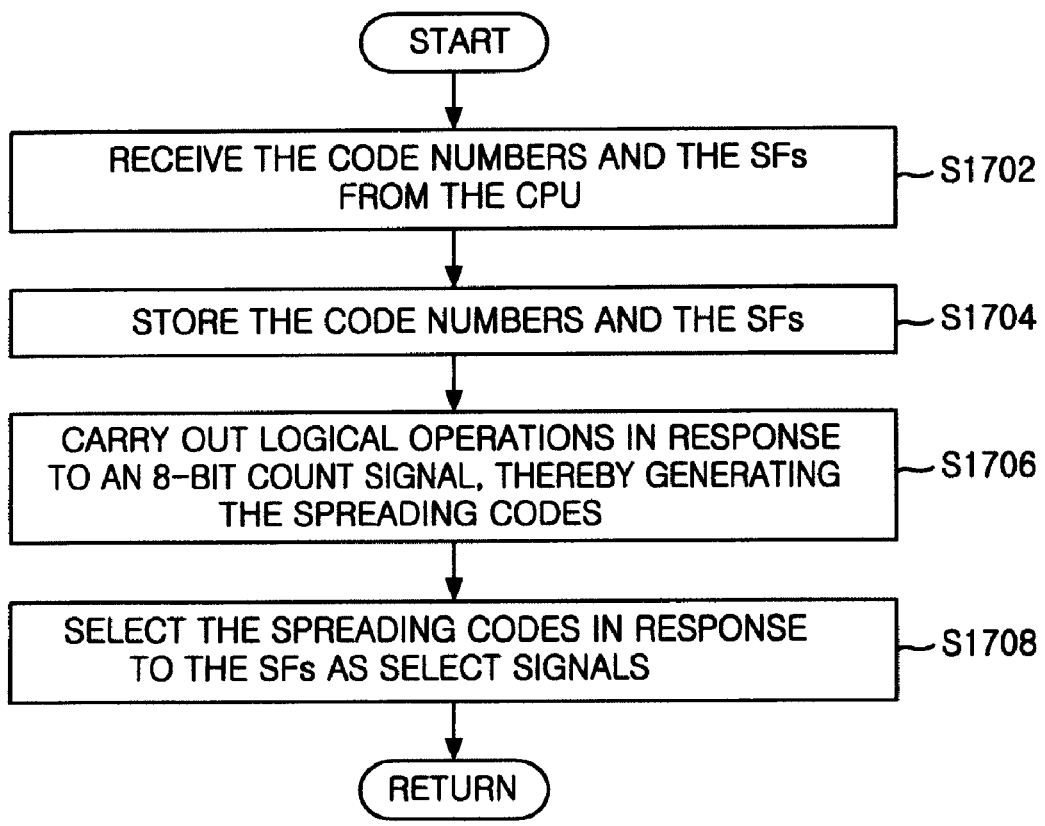

Referring to FIG. 20, there is shown a flowchart showing a procedure of generating the spreading codes.

As shown, at step S1702, registers receive the code numbers and the SFs from the CPU.

At step S1704, registers store the code numbers and the SFs.

At step S1706, logical operators carry out logical operations in response to an 8-bit count value, thereby generating the spreading codes.

At step S1708, multiplexers select the spreading codes in response to the SFs as select signals.

Figure 21:
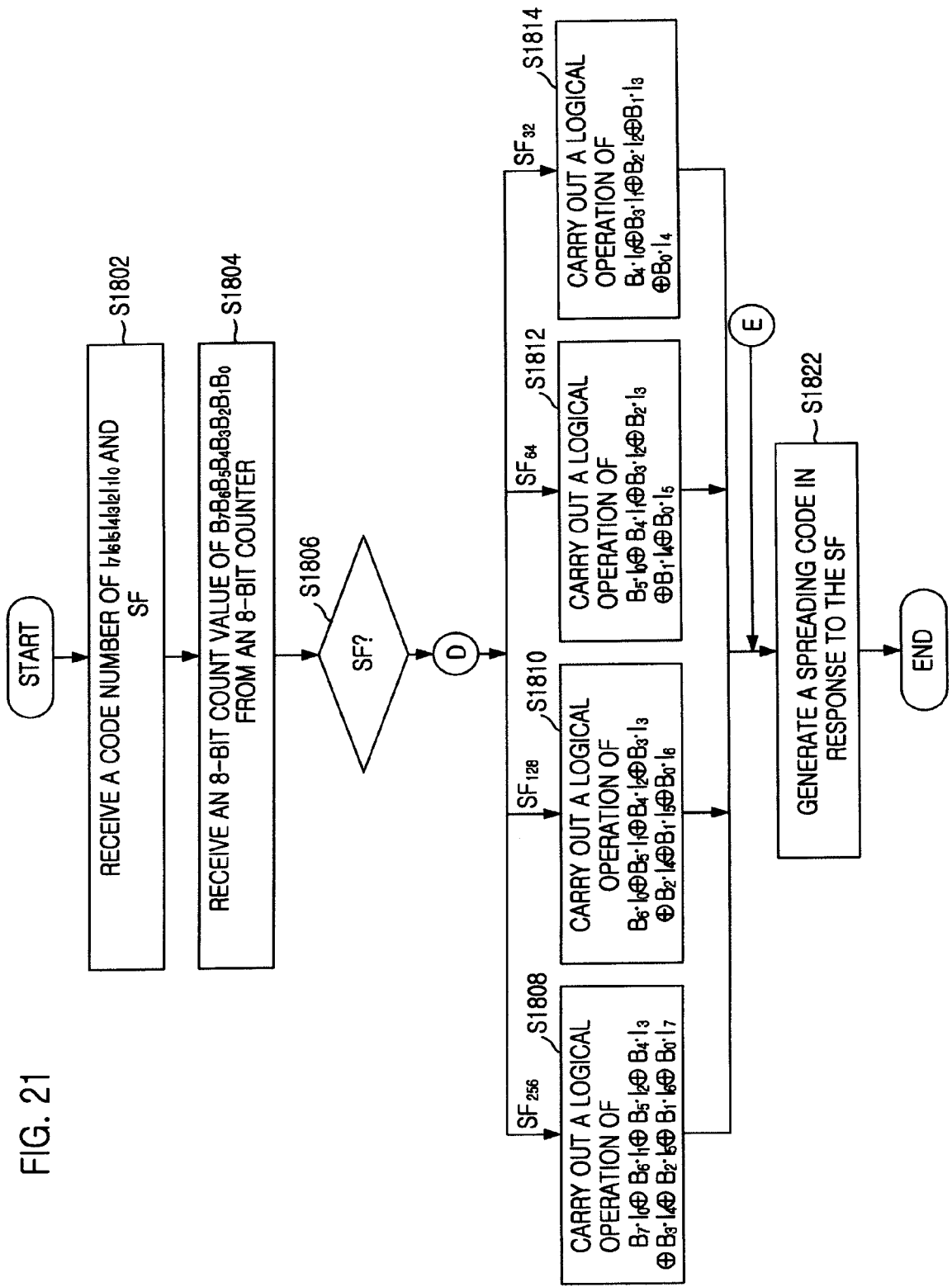
Figure 22:
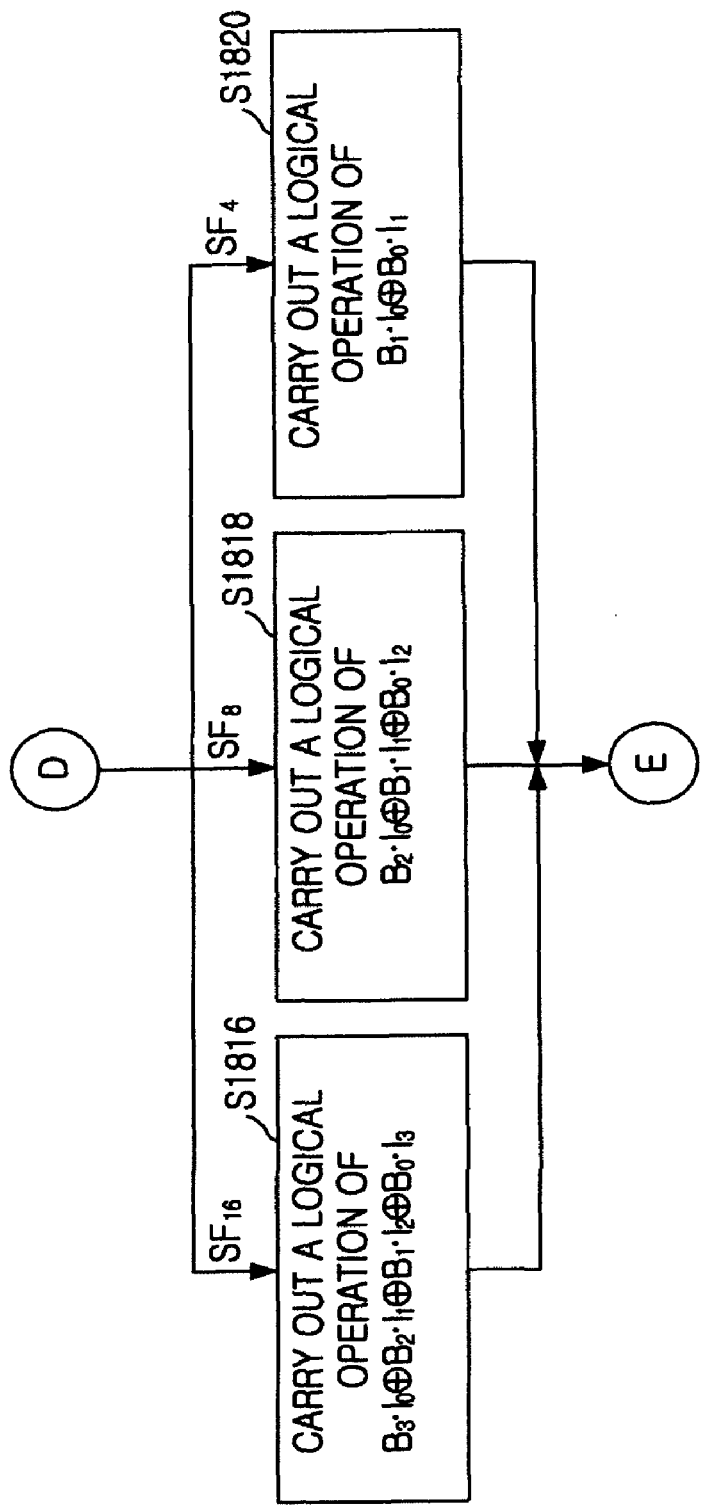

Referring to FIGS. 21 and 22, there are shown flowcharts describing a procedure of carrying out the logical operations in response to the 8-bit count value, thereby generating the spreading codes.

As shown, at step S1802, each register receives a code number of $I_7 I_6 I_5 I_4 I_3 I_2 I_1 I_0$ and a predetermined SF.

At step 1804, each register receives an 8-bit count value of $B_7 B^6 B_5 B_4 B_3 B_2 B_1 B_0$ from an 8-bit counter.

At step S1806, a type of the predetermined SF is determined.

At step S1808, if the predetermined SF is $SF_{256}$, each logical operator carries out a logical operation of $B_7 \cdot I_0 \oplus B_6 \cdot I_1 \oplus B_5 \cdot I_2 \oplus B_4 \cdot I_3 \oplus B_3 \cdot I_4 \oplus B_2 \cdot I_5 \oplus B_1 \cdot I_6 \oplus B_0 \cdot I_7$.

At step S1810, if the predetermined SF is $SF_{128}$, each logical operator carries out a logical operation of $B_6 \cdot I_0 \oplus B_5 \cdot I_1 \oplus B_4 \cdot I_2 \oplus B_3 \cdot I_3 \oplus B_2 \cdot I_4 \oplus B_1 \cdot I_5 \oplus B_0 \cdot I_6$.

At step S1812, if the predetermined SF is $SF_{64}$, each logical operator carries out a logical operation of $B_5 \cdot I_0 \oplus B_4 \cdot I_1 \oplus B_3 \cdot I_2 \oplus B_2 \cdot I_3 \oplus B_1 \cdot I_4 \oplus B_0 \cdot I_5$.

At step S1814, if the predetermined SF is $SF_{32}$, each logical operator carries out a logical operation of $B_4 \cdot I_0 \oplus B_3 \cdot I_1 \oplus B_2 \cdot I_2 \oplus B_1 \cdot I_3 \oplus B_0 \cdot I_4$.

At step S1816, if the predetermined SF is $SF_{16}$, each logical operator carries out a logical operation of $B_3 \cdot I_0 \oplus B_2 \cdot I_1 \oplus B_1 \cdot I_2 \oplus B_0 \cdot I_3$.

At step S1818, if the predetermined SF is $SF_8$, each logical operator carries out a logical operation of $B_2 \cdot I_0 \oplus B_1 \cdot I_1 \oplus B_0 \cdot I_2$.

At step S1820, if the predetermined SF is $SF_4$, each logical operator carries out a logical operation of $B_1 \cdot I_0 \oplus B_0 \cdot I_1$.

At step S1822, each multiplexer generates a spreading code in response to the SF.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A mobile station, capable of using a plurality of data channels and a control channel, that converts source data to a channel-modulated signal, comprising:
   a channel coding unit that encodes the source data to generate a plurality of data parts and a control part, wherein the data parts are allocated to the data channels and the control part is allocated to the control channel;
   a code generator that generates spreading codes to be allocated to the channels, wherein each of the spreading codes is generated on the basis of a spreading factor related to a data rate for the respective channel and a code number for the respective channel; and
   a spreader that spreads the control channel and the data channels using the allocated spreading codes to thereby generate the channel-modulated signal, wherein:
   the spreading codes correspond to orthogonal variable spreading factor (OVSF) codes,
   the spreading code allocated to the control channel is represented by $C_{256, 0}$, where 256 denotes the spreading factor and 0 the code number,
   the spreading codes allocated to first and second data channels are represented by $C_{4, 1}$, and
   the code generator comprises:
      a counter that consecutively produces a count value in synchronization with a clock signal,
      a first spreading code generator responsive to the count value and the spreading factor for each data channel that generates the spreading code to be allocated to each data channel, and
      a second spreading code generator responsive to the count value and the spreading factor for the control channel that generates the spreading code to be allocated to the control channel.

2. The mobile station of claim 1, wherein the first spreading code generator comprises:
   a first logical operator responsive to the count value that carries out a first logical operation with the spreading factor for the respective data channel and the code number for the respective data channel, to thereby generate the spreading code to be allocated to the respective data channel; and
   a first selector that outputs the spreading code to be allocated to the respective data channel in response to a first select signal.

3. The mobile station of claim 2, wherein the first logical operator receives a code number of $I_7 I_6 I_5 I_4 I_3 I_2 I_1 I_0$, a count value of $B_7 B_6 B_5 B_4 B_3 B_2 B_1 B_0$, and a predetermined spreading factor, and wherein the first logical operation is $$\prod_{i=0}^{N-1} \oplus I_i \cdot B_{N-1-i}$$

if the predetermined spreading factor is $2^N$ where N is 2 to 8.

4. The mobile station of claim 2, wherein the code number to be used in the first logical operation is represented by $I_7 I_6 I_5 I_4 I_3 I_2 I_1 I_0$, wherein the count value to be used in the first logical operation is represented by $B_7 B_6 B_5 B_4 B_3 B_2 B_1 B_0$, and wherein the first logical operation is $$\prod_{i=0}^{N-1} \oplus I_i \cdot B_{N-1-i}$$

where the spreading factor is $2^N$ and N is 2 to 8.

5. The mobile station of claim 4, wherein the second spreading code generator comprises:
   a second logical operator responsive to the count value that carries out a second logical operation with the spreading factor for the control channel and the code number for the control channel, to thereby generate the spreading code to be allocated to the control channel, and
   a second selector that outputs the spreading code to be allocated to the control channel in response to a second select signal.

6. The mobile station of claim 5, wherein the code number to be used in the second logical operation is represented by $I_7 I_6 I_5 I_4 I_3 I_2 I_1 I_0$, wherein the count value to be used in the second logical operation is represented by $B_7 B_6 B_5 B_4 B_3 B_2 B_1 B_0$, and wherein the second logical operation is $$\prod_{i=0}^{N-1} \oplus I_i \cdot B_{N-1-i}$$

where the predetermined spreading factor is $2^N$ and N is 2 to 8.

7. The mobile station of claim 6, wherein $C_{4, 1}$ represents $\{1, 1, -1, -1\}$.

8. The mobile station of claim 7, wherein the code generator further comprises a controller responsive to the spreading factors for the channels that generates the code numbers for the channels.

9. The mobile station of claim 1, wherein the second spreading code generator comprises:
   a second logical operator responsive to the count value that carries out a second logical operation with the spreading factor for the control channel and the code number for the control channel, to thereby generate the spreading code to be allocated to the control channel, and
   a second selector that outputs the spreading code to be allocated to the control part in response to a second select signal.

10. The mobile station of claim 9, wherein the second logical operator receives a code number of $I_7I_6I_5I_4I_3I_2I_1I_0$, a count value of $B_7B_6B_5B_4B_3B_2B_1B_0$, and a predetermined spreading factor, and wherein the second logical operation is $$\prod_{i=0}^{N-1} \oplus I_i \cdot B_{N-1-i}$$

if the predetermined spreading factor is $2^N$ where N is 2 to 8.

11. The mobile station of claim 9, wherein the code number to be used in the second logical operation is represented by $I_7I_6I_5I_4I_3I_2I_1I_0$, wherein the count value to be used in the second logical operation is represented by $B_7B_6B_5B_4B_3B_2B_1B_0$, and wherein the second logical operation is $$\prod_{i=0}^{N-1} \oplus I_i \cdot B_{N-1-i}$$

where the spreading factor is $2^N$ where N is 2 to 8.

12. The mobile station of claim 1, wherein $C_{4,1}$ represents $\{1, 1, -1, -1\}$.

13. The mobile station of claim 1, wherein $C_{4,1}$ is represented by a series of a pair of positive one integer and a pair of negative one integer.

14. The mobile station of claim 1, wherein the code generator further comprises a controller responsive to the spreading factors for the channels that generates the code numbers for the channels.

15. A mobile station as in any one of claims 1-14, wherein the channel-modulated signal has a plurality of pairs of in-phase (I) and quadrature-phase (Q) data and wherein the spreading codes are selected so that two consecutive pairs of the I and Q data are correspondent to two points located on the same point or symmetrical with respect to a zero point on a phase domain.

16. A spreading method for a mobile station, capable of using a plurality of data channels and a control channel, for converting source data to a channel-modulated signal, the spreading method comprising:
encoding the source data to generate a plurality of data parts and a control part, wherein the data parts are allocated to the data channels and the control part is allocated to the control channel;
generating spreading codes to be allocated to the channels, wherein each of the spreading codes is generated on the basis of a spreading factor related to a data rate for the respective channel and a code number for the respective channel, wherein the step of generating spreading codes to be allocated to the channels comprises:
consecutively producing a count value in synchronization with a clock signal,
in response to the count value and the spreading factor for each data channel, generating the spreading code to be allocated to each data channel, and
in response to the count value and the spreading factor for the control channel, generating the spreading code to be allocated to the control channel; and
spreading the control channel and the data channels using the allocated spreading codes to thereby generate the channel-modulated signal, wherein:
the spreading codes correspond to orthogonal variable spreading factor (OVSF) codes,
the spreading code allocated to the control channel is represented by $C_{256,0}$, where 256 denotes the spreading factor and 0 the code number,
the spreading codes allocated to first and second data channels are represented by $C_{4,1}$.

17. The spreading method of claim 16, wherein the step of generating the spreading code to be allocated to each data channel comprises:
in response to the count value, carrying out a first logical operation with the spreading factor for the respective data channel and the code number for the respective data channel, to thereby generate the spreading code to be allocated to the respective data channel; and
outputting the spreading code to be allocated to the respective data channel in response to a first select signal.

18. The spreading method of claim 17, wherein a code number of $I_7I_6I_5I_4I_3I_2I_1I_0$, a count value of $B_7B_6B_5B_4B_3B_2B_1B_0$, and a predetermined spreading factor are received for the first logical operation, and wherein the first logical operation is $$\prod_{i=0}^{N-1} \oplus I_i \cdot B_{N-1-i}$$

if the predetermined spreading factor is $2^N$ where N is 2 to 8.

19. The spreading method of claim 17, wherein the code number to be used in the first logical operation is represented by $I_7I_6I_5I_4I_3I_2I_1I_0$, wherein the count value to be used in the first logical operation is represented by $B_7B_6B_5B_4B_3B_2B_1B_0$, and wherein the first logical operation is $$\prod_{i=0}^{N-1} \oplus I_i \cdot B_{N-1-i}$$

where the spreading factor is $2^N$ and N is 2 to 8.

20. The spreading method of claim 19, wherein the step of generating the spreading code to be allocated to the control channel comprises:
in response to the count value, carrying out a second logical operation with the spreading factor for the control channel and the code number for the control channel, to thereby generate the spreading code to be allocated to the control channel; and
outputting the spreading code to be allocated to the control channel in response to a second select signal.

21. The spreading method of claim 20, wherein the code number to be used in the second logical operation is represented by $I_7I_6I_5I_4I_3I_2I_1I_0$, wherein the count value to be used in the second logical operation is represented by $B_7B_6B_5B_4B_3B_2B_1B_0$, and wherein the second logical operation is $$\prod_{i=0}^{N-1} \oplus I_i \cdot B_{N-1-i}$$

where the spreading factor is $2^N$ and N is 2 to 8.

22. The spreading method of claim 21, wherein $C_{4,1}$ represents $\{1, 1, -1, -1\}$.

23. The spreading method of claim 22, wherein the step of generating spreading codes to be allocated to the channels further comprises:

in response to the spreading factor, generating the code numbers for the channels.

24. The spreading method of claim 16, wherein the step of generating the spreading code to be allocated to the control channel comprises:

in response to the count value, carrying out a second logical operation with the spreading factor for the control channel and the code number for the control channel, to thereby generate the spreading code to be allocated to the control channel; and outputting the spreading code to be allocated to the control channel in response to a second select signal.

25. The spreading method of claim 24, wherein a code number of $I_7I_6I_5I_4I_3I_2I_1I_0$, a count value of $B_7B_6B_5B_4B_3B_2B_1B_0$, and a predetermined spreading factor are received for the second logical operation, and wherein the second logical operation is $$\prod_{i=0}^{N-1} \oplus I_i \cdot B_{N-1-i}$$

if the predetermined spreading factor is $2^N$ where N is 2 to 8.

26. The spreading method of claim 24, wherein the code number to be used in the second logical operation is represented by $I_7I_6I_5I_4I_3I_2I_1I_0$, wherein the count value to be used in the second logical operation is represented by $B_7B_6B_5B_4B_3B_2B_1B_0$, and wherein the second logical operation is $$\prod_{i=0}^{N-1} \oplus I_i \cdot B_{N-1-i}$$

where the spreading factor is $2^N$ and N is 2 to 8.

27. The spreading method of claim 16, wherein $C_{4,1}$ represents $\{1, 1, -1, -1\}$.

28. The spreading method of claim 16, wherein $C_{4,1}$ is represented by a series of a pair of positive one integer and a pair of negative one integer.

29. The spreading method of claim 16, wherein the step of generating spreading codes to be allocated to the channels further comprises:

in response to the spreading factor, generating the code numbers for the channels.

30. A spreading method as in any one of claims 16-29, wherein the channel-modulated signal has a plurality of pairs of in-phase (I) and quadrature-phase (Q) data and wherein the spreading codes are selected so that two consecutive pairs of the I and Q data are correspondent to two points located on the same point or symmetrical with respect to a zero point on a phase domain.

* * * * *